(12) United States Patent
Li et al.

(10) Patent No.: US 9,247,018 B2
(45) Date of Patent: Jan. 26, 2016

(54) METHOD AND APPARATUS FOR COOPERATION BETWEEN PUSH DEVICES

(71) Applicant: Huawei Technologies Co., Ltd., Shenzhen (CN)

(72) Inventors: Bojie Li, Shanghai (CN); Chenghui Peng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 466 days.

(21) Appl. No.: 13/753,833

(22) Filed: Jan. 30, 2013

(65) Prior Publication Data

US 2013/0144954 A1 Jun. 6, 2013

Related U.S. Application Data

(63) Continuation of application No. PCT/CN2011/074345, filed on May 19, 2011.

(30) Foreign Application Priority Data

Jul. 30, 2010 (CN) .......................... 2010 1 0244030

(51) Int. Cl.
*H04L 29/08* (2006.01)
*H04L 29/12* (2006.01)
*H04L 29/06* (2006.01)

(52) U.S. Cl.
CPC .............. *H04L 67/26* (2013.01); *H04L 61/103* (2013.01); *H04L 61/2076* (2013.01); *H04L 61/605* (2013.01); *H04L 67/28* (2013.01); *H04L 63/0892* (2013.01)

(58) Field of Classification Search
CPC ............... H04L 12/1859; H04L 29/12301; H04L 29/12311; H04L 29/12952; H04L 61/15; H04L 61/2076; H04L 61/2084; H04L 67/26; H04L 67/28; H04L 69/2084
USPC ................. 709/203, 205, 206, 217, 219, 223; 455/466; 370/401
See application file for complete search history.

(56) References Cited

U.S. PATENT DOCUMENTS 6,885,861 B2 * 4/2005 Koskelainen ............... 455/414.2
7,079,517 B2 * 7/2006 Verkama ........................ 370/338

(Continued)

FOREIGN PATENT DOCUMENTS

CN 1585372 A 2/2005
CN 1801764 A 7/2006

(Continued)

OTHER PUBLICATIONS

Ozugur, "A Novel Approach to Deliver Push Data to Dynamic IP Addresses in Cellular Networks," IEEE International Conference on Communications, 2003, vol. 2, May 11-15, 2003, pp. 959-963.*

(Continued)

*Primary Examiner* — Vivek Srivastava
*Assistant Examiner* — William C McBeth
(74) *Attorney, Agent, or Firm* — Conley Rose, P.C.; Grant Rodolph; Nicholas K. Beaulieu

(57) ABSTRACT

A method and an apparatus for cooperation between push devices to improve the validity and reachability of Internet Protocol (IP) connections. The method for cooperation between push devices includes: obtaining, by a Push proxy, a Push identifier and an address of a Push client; storing, by the Push proxy, a mapping between the Push identifier and the address of the Push client; and if the address of the Push client changes, updating, by the Push proxy, the corresponding address in the mapping. With the embodiments of the present invention, validity and reachability of IP connections can be improved, and the real-time performance and reliability of Push messages can be improved.

4 Claims, 19 Drawing Sheets

(56) References Cited

U.S. PATENT DOCUMENTS

| | | | |
|---|---|---|---|
| 7,177,628 B2* | 2/2007 | Sommers et al. | 455/414.1 |
| 7,254,614 B2* | 8/2007 | Mulligan et al. | 709/207 |
| 7,289,462 B1* | 10/2007 | Mizell et al. | 370/328 |
| 2003/0018726 A1* | 1/2003 | Low et al. | 709/206 |
| 2003/0165121 A1* | 9/2003 | Leung | H04L 29/12009 370/401 |
| 2003/0210678 A1 | 11/2003 | Haukka | |
| 2003/0233329 A1* | 12/2003 | Laraki et al. | 705/52 |
| 2003/0233537 A1* | 12/2003 | Wohlgemuth et al. | 713/151 |
| 2004/0185888 A1* | 9/2004 | Serge | 455/517 |
| 2004/0205233 A1* | 10/2004 | Dunk | 709/238 |
| 2005/0015427 A1* | 1/2005 | Guo et al. | 709/200 |
| 2005/0169249 A1* | 8/2005 | Shirota et al. | 370/352 |
| 2005/0169285 A1* | 8/2005 | Wills et al. | 370/401 |
| 2005/0172026 A1* | 8/2005 | Jeon et al. | 709/228 |
| 2005/0201320 A1* | 9/2005 | Kiss et al. | 370/328 |
| 2006/0133335 A1* | 6/2006 | Garcia-Martin | 370/338 |
| 2007/0011292 A1* | 1/2007 | Fritsch et al. | 709/223 |
| 2007/0213039 A1* | 9/2007 | Skog | 455/414.3 |
| 2009/0158397 A1* | 6/2009 | Herzog et al. | 726/4 |
| 2010/0009704 A1* | 1/2010 | Fan et al. | 455/466 |
| 2010/0138501 A1* | 6/2010 | Clinton et al. | 709/206 |
| 2010/0227632 A1* | 9/2010 | Bell et al. | 455/466 |
| 2011/0113135 A1* | 5/2011 | Rudenko et al. | 709/224 |
| 2012/0040690 A1 | 2/2012 | Zhao et al. | |

FOREIGN PATENT DOCUMENTS

| | | |
|---|---|---|
| CN | 101222414 A | 7/2008 |
| CN | 101730101 A | 6/2010 |
| FR | EP 2254309 A1 * 11/2010 | H04L 67/26 |
| WO | 2006109202 A1 | 10/2006 |
| WO | 2009056026 A1 | 5/2009 |

OTHER PUBLICATIONS

Podnar et al., "Mobile Push: Delivering Content to Mobile Users," Proceedings of the 22nd International Conference on Distributed Computing Systems Workshops, 2002, pp. 563-568.*

Tosi, "An Advanced Architecture for Push Services," Fourth International Conference on Web Information Systems Engineering Workshops, Dec. 13, 2003, pp. 193-200.*

Foreign Communication From a Counterpart Application, PCT Application PCT/CN2011/074345, English Translation of Written Opinion dated Aug. 11, 2011, 4 pages.

Foreign Communication From a Counterpart Application, PCT Application PCT/CN2011/074345, International Search Report dated Aug. 11, 2011, 4 pages.

Communication from a foreign counterpart application, International Application No. PCT/CN2011/074345, English Translation, International Search Report dated Aug. 11, 2011, 4 pages.

Foreign Communication From a Counterpart Application, Chinese Application No. 201010244030.9, Chinese Office Action dated Jun. 13, 2013, 11 pages.

Foreign Communication From a Counterpart Application, Chinese Application No. 201010244030.9, English Translation of Chinese Office Action dated Jun. 13, 2013, 13 pages.

Yang, S., et al., "Route Optimization Mechanism Based on Identifier/Locator Split for Nested Mobile Network," Acta Electronica Sinica, vol. 36, No. 7, Jul. 2008, pp. 1261-1267.

* cited by examiner

METHOD AND APPARATUS FOR COOPERATION BETWEEN PUSH DEVICES

CROSS-REFERENCE TO RELATED APPLICATIONS

This application is a continuation of International Application No. PCT/CN2011/074345, filed on May 19, 2011, which claims priority to Chinese Patent Application No. 201010244030.9, filed on Jul. 30, 2010, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communication technologies, and in particular, to a method and an apparatus for cooperation between push devices.

BACKGROUND

In a client/server model, unless a user logs in to an application server and provides its Internet Protocol (IP) address to the application server, the application server is unable to actively find a user terminal and send information to the user terminal. Therefore, a Push technology is developed.

The Push technology is a technology that allows an application server to actively send information to a client based on a client/server mechanism. To be specific, the Push transaction is initiated by the application server, and the user is not required to log in to the application server beforehand. The Push technology in essence is to let information actively find a user, and its advantage lies in active and timely information. By using this technology, information may be pushed to a user equipment as quickly as possible.

At present, Apple, Inc. launches a Push Notification solution applied to i-phones. The solution uses the Push technology. When an application of the user has an incoming event (for example, a new email is received), the event is directly pushed to the client, and the client is not required to keep the application online or periodically log in to the application server to see whether any new event occurs. The working process of the Push Notification solution may be summarized as follows:

1. The application server packetizes an application message to be sent and the identifier of a destination i-phone into a Notification message and sends the Notification message to a Push server.

2. The Push server finds the IP address of the destination i-phone in a list of i-phones that have registered the Push service, converts the Notification message into a Push message, and sends the Push message to the destination i-phone.

3. The destination i-phone transfers the received Push message to a corresponding client application and pops up a Push notification according to the setting.

The identifier of a destination i-phone is the basis for the Push server to judge to which i-phone the Push message should be sent. This identifier is known as a device token. After network entry, the i-phone establishes a permanent IP connection with the Push server. After the connection is established, the i-phone registers with the Push server, the Push server sends the device token to the i-phone, and the i-phone sends the device token to the application server through the client application. Later, if the application server needs to send an application message to the i-phone, the application server sends the corresponding device token and the application message together to the Push server, and then the Push server finds the corresponding destination i-phone according to the device token and sends the corresponding Push message.

When no data is transferred, a heartbeat operation is performed between the Push server and the i-phone at intervals of a dozen minutes to maintain the validity of the IP connection. In the process of establishing a connection with the i-phone, the Push server records the IP connection information, which includes the address and port of the i-phone. If network address translation (NAT) is available between the i-phone and the Push server, what is recorded by the Push server is the public IP address and port of the i-phone after NAT.

The preceding solution is unable to guarantee the validity and reachability of the IP connection. Consequently, the Push message fails to be pushed or is pushed to other terminals incorrectly, and the real-time performance and reliability of the Push message are affected.

SUMMARY

Embodiments of the present invention provide a method and an apparatus for cooperation between push devices to improve the validity and reachability of IP connections.

An embodiment of the present invention provides a method for cooperation between push devices, including: obtaining, by a push proxy, a push identifier and an address of a push client; storing, by the push proxy, mapping between the push identifier and the address of the push client; and if the address of the push client changes, updating, by the push proxy, the corresponding address in the mapping.

An embodiment of the present invention provides another method for cooperation between push devices, including: obtaining, by a push proxy, a push identifier, an intra-network identifier, and an address of a push client; storing, by the push proxy, mapping between the push identifier, the intra-network identifier, and the address of the push client; and if the address of the push client changes, updating, by the push proxy, the corresponding address in the mapping.

An embodiment of the present invention provides an apparatus for cooperation between push devices, including: a first obtaining module configured to obtain a push identifier and an address of a push client; a first storing module configured to store mapping between the push identifier and the address of the push client; and a first updating module configured to update the corresponding address in the mapping if the address of the push client changes.

An embodiment of the present invention provides another apparatus for cooperation between push devices, including: a second obtaining module configured to obtain a push identifier, an intra-network identifier, and an address of a push client; a second storing module configured to store mapping between the push identifier, the intra-network identifier, and the address of the push client; and a second updating module configured to update the corresponding address in the mapping if the address of the push client changes.

Compared with the prior art, the embodiments of the present invention have the following advantages.

In the embodiments of the present invention, the Push proxy obtains the Push identifier and the address of the Push client and stores the mapping between the Push identifier and the address of the Push client; and when the address of the Push client changes, the Push proxy may timely update the address of the Push client. Therefore, the validity and reachability of IP connections can be improved, and the real-time performance and reliability of Push messages can be improved.

BRIEF DESCRIPTION OF THE DRAWINGS

To make the technical solutions of the embodiments of the present invention clearer, the accompanying drawings used in the description of the embodiments are briefly described hereunder. Evidently, the accompanying drawings illustrate only some exemplary embodiments of the present invention, and persons of ordinary skill in the art may obtain other drawings based on these drawings without creative efforts.

DETAILED DESCRIPTION

The technical solutions of the embodiments of the present invention are hereinafter described clearly and completely with reference to the accompanying drawings in the embodiments of the present invention. Evidently, the described embodiments are only some exemplary embodiments of the present invention, rather than all embodiments of the present invention. All other embodiments obtained by persons of ordinary skill in the art based on the embodiments of the present invention without creative efforts shall fall within the protection scope of the present invention.

In the embodiments of the present invention, a Push proxy is deployed in a network of an operator. The Push proxy works as a forwarder between a Push server and a Push client to process signaling between the Push server and the Push client and forward, to the Push client, a Push message sent by the Push server. Meanwhile, when the address of the Push client changes, the Push proxy may timely update the address of the Push client stored on the Push proxy, without the need of heartbeat operations. Therefore, the validity and reachability of IP connections of the Push client can be improved, and the real-time performance and reliability of Push messages can be improved.

The Push server is a server that can provide a Push service. The Push client is a terminal that has subscribed to the Push service during network entry, for example, a personal computer (PC), a mobile phone, and a personal digital assistant (PDA). The address of the Push client may be either an IP address or an IP address and a port.

The Push proxy is a logical entity. In terms of a physical device, the Push proxy may be located on the same device as a network-side network element or may be independently deployed on a different device. The network-side network element may be a data gateway node, a home location register (HLR), a home subscriber server (HSS), or an authentication, authorization and accounting (AAA) server. The data gateway node may be a gateway General Packet Radio Service (GPRS) support node (GGSN) in a 3rd-generation (3G) network, or a packet data network gateway (PDNGW) in a long term evolution (LTE) network, or a home agent (HA) in a worldwide interoperability for microwave access (WIMAX) network, or equivalent entities in other networks. When the Push proxy and the network-side network element (such as the data gateway node) are located on the same device, the interaction or trigger between the Push proxy and the network-side network element is internal interaction or trigger, for example, internal interaction or trigger implemented through inter-process communication and function invocation. If the Push proxy and the network-side network element (such as the data gateway node) share data, the steps of interaction or trigger between the Push proxy and the network-side network element may be omitted.

Embodiment 1

Figure 1:
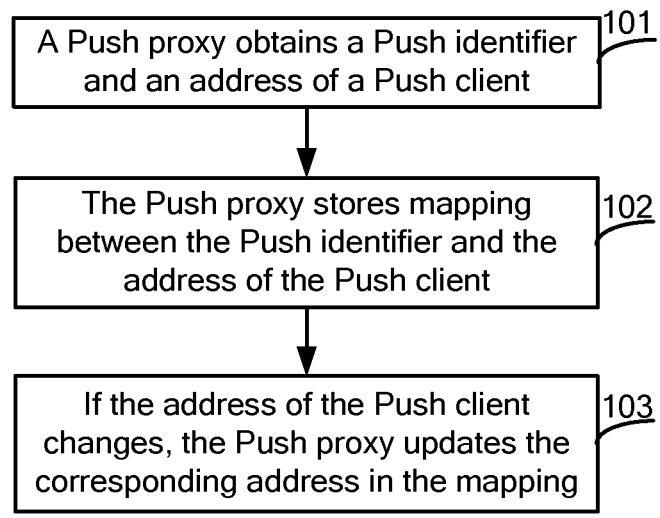
FIG. 1 is a flowchart of a method for cooperation between push devices according to an embodiment of the present invention.

FIG. 1 is a flowchart of a method for cooperation between push devices according to an embodiment of the present invention. As shown in FIG. 1, the method may include the following steps:

101. A Push proxy obtains a Push identifier and an address of a Push client.

In the embodiment, the address of the Push client may be either the IP address of the Push client or an IP address and a port.

The Push identifier of the Push client may be a device token of the Push client, or may be a parameter or an identifier that can represent the identity of the Push client. After network entry, the Push client may establish a permanent IP connection with a Push server. After the connection is established, the Push client registers with the Push server, and the Push server sends the device token to the Push client.

102. The Push proxy stores mapping between the Push identifier and the address of the Push client.

The Push proxy may store mapping between Push identifiers and addresses of multiple Push clients to form a mapping table of Push identifiers and addresses. In the mapping table, the Push identifiers of the Push clients are different from each other, and generally, the addresses of the Push clients are also different from each other.

103. If the address of the Push client changes, the Push proxy updates the corresponding address in the mapping.

Figure 2:
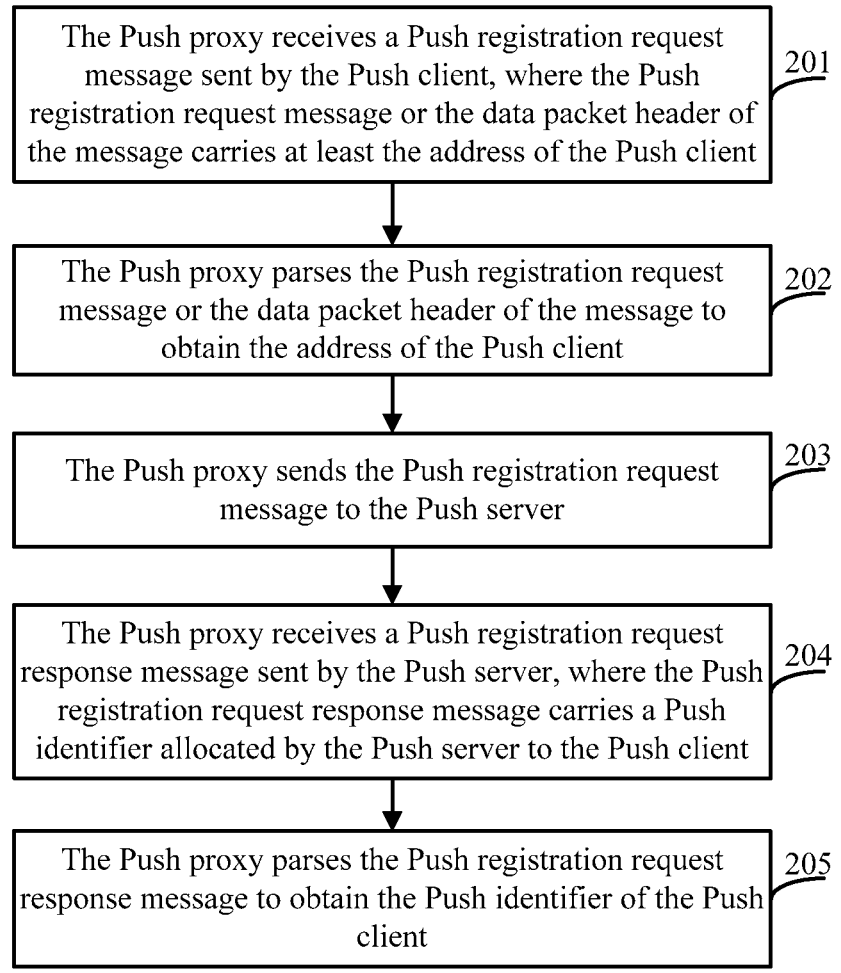
FIG. 2 and FIG. 3 are flowcharts of a method for obtaining a Push identifier and an address of a Push client according to an embodiment of the present invention.

In the embodiment, the Push proxy may obtain the Push identifier and the address of the Push client by using the following two methods:

Method 1: The Push proxy obtains the Push identifier and the address of the Push client by receiving and forwarding a Push registration request message of the Push client. As shown in FIG. 2, the method may include the following steps:

201. The Push proxy receives a Push registration request message sent by the Push client, where the Push registration request message or the header of the data packet of the message carries the address of the Push client and may further carry the address of the Push server.

The data packet is a data packet of the Push registration request message.

202. The Push proxy parses the Push registration request message or the data packet header of the message to obtain the address of the Push client.

203. The Push proxy sends the Push registration request message to the Push server.

Optionally, the Push proxy may write its address into the Push registration request message before sending the message to the Push server. For example, the Push proxy may update the address of the Push client carried in the Push registration request message to the address of the Push proxy, so that the address of the Push proxy is written into the Push registration request message; or, the Push proxy may directly add the address of the Push proxy to the Push registration request message, and this does not affect the implementation of the embodiment of the present invention.

204. The Push proxy receives a Push registration request response message sent by the Push server, where the Push registration request response message carries a Push identifier allocated by the Push server to the Push client.

After receiving the Push registration request message sent by the Push proxy, the Push server allocates a Push identifier to the Push client, and by using the address of the Push proxy, carries the Push identifier allocated to the Push client in the Push registration request response message, and sends the Push registration request response message to the Push proxy.

Preferably, after the Push server allocates a Push identifier to the Push client, the mapping between the Push identifier of the Push client and the address of the Push proxy may be stored.

205. The Push proxy parses the Push registration request response message to obtain the Push identifier of the Push client.

In the embodiment, the Push registration request message that is sent by the Push client and received by the Push proxy in step 201 may further carry authentication information of the Push client, where the authentication information is used to prove the identity of the Push client to the Push server and includes a certificate, an account name, a password, a message digest generated from key materials.

Accordingly, in step 202, the Push proxy may obtain the authentication information of the Push client by parsing the Push registration request message.

Accordingly, after receiving the Push registration request message sent by the Push proxy and authenticating the identity of the Push client as legal according to authentication information of the Push client, the Push server allocates a Push identifier to the Push client, and by using the address of the Push proxy, carries the Push identifier allocated to the Push client in the Push registration request response message, and sends the Push registration request response message to the Push proxy.

Figure 3:
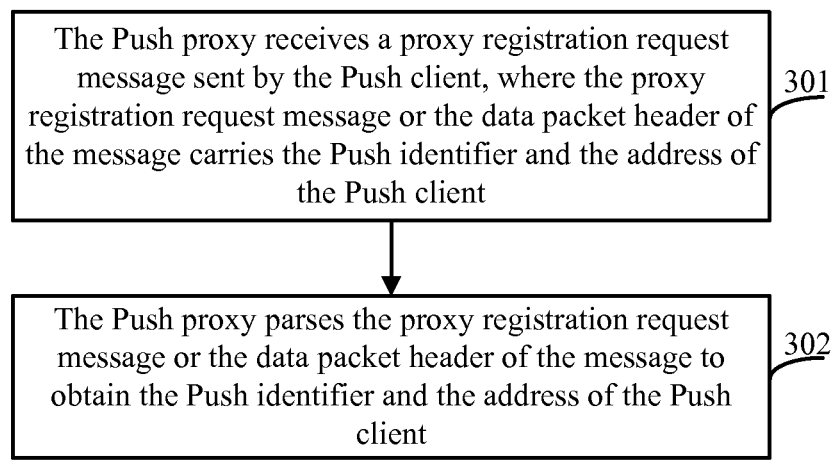

Method 2: The Push proxy obtains the Push identifier and the address of the Push client without the need of forwarding the Push registration request message of the Push client. As shown in FIG. 3, the method may include the following steps:

301. The Push proxy receives a proxy registration request message sent by the Push client, where the proxy registration request message or the data packet header of the message carries the Push identifier and the address of the Push client.

302. The Push proxy parses the proxy registration request message or the data packet header of the message to obtain the Push identifier and the address of the Push client.

The prerequisite for the Push proxy to obtain the Push identifier and the address of the Push client by using method 2 is that the Push client needs to register with the Push server beforehand and obtain the Push identifier of the Push client. Specifically, the Push client registers with the Push server and obtains the Push identifier of the Push client as follows:

(1) The Push client sends a Push registration request message to the Push server.

The Push registration request message sent by the Push client or the data packet header of the message carries the address of the Push client and may further carry the address of the Push server.

Optionally, the Push registration request message sent by the Push client may further carry the authentication information of the Push client, so that after receiving the Push registration request message sent by the Push client, the Push server authenticates the identity of the Push client as legal according to the authentication information of the Push client and then allocates a Push identifier to the Push client.

(2) The Push client receives a Push registration request response message sent by the Push server, where the Push registration request response message carries the Push identifier allocated by the Push server to the Push client.

Optionally, the Push registration request message sent by the Push client in step (1) may further carry the address of the Push proxy, so that after the Push server allocates a Push identifier to the Push client, the mapping between the Push identifier of the Push client and the address of the Push proxy may be stored.

The address of the Push proxy may be configured on the Push client beforehand, or dynamically discovered by the Push client through the Dynamic Host Configuration Protocol (DHCP), domain name system (DNS), and so on, or determined by the Push server by redirection when the Push client establishes a connection with the Push server or registers with the Push server.

(3) The Push client parses the Push registration request response message to obtain the Push identifier of the Push client.

In the embodiment, if the address of the Push client changes in step 103, the Push proxy updates the address of the Push client in the mapping. Specifically, the change of the address of the Push client may include two cases: update and release.

Case 1: A network-side network element starts the update of the address of the Push client. The specific process is as follows:

(1) The Push proxy receives an address update message sent by the network-side network element, where the address update message carries an original address of the Push client and a new address after the change which are perceived by the network-side network element.

In the embodiment, the network-side network element may be a data gateway node, an HLR, an HSS, or an AAA server.

(2) The Push proxy queries the stored mapping between the Push identifier and the address of the Push client according to the original address and updates the corresponding address in the mapping according to the new address.

In the scenario of case 1, the Push proxy needs to inform the network-side network element beforehand that when the network-side network element perceives the change of the address of the Push client, the Push proxy should be notified in time. See the following example:

The Push proxy sends a trigger message to the network-side network element, where the trigger message carries the address of the Push client and is used to trigger the network-side network element to notify the Push proxy when the network-side network element perceives the change of the address of the Push client.

Optionally, in the embodiment, the Push proxy and the network-side network element may be located on the same device. In this case, the interaction or trigger between the Push proxy and the network-side network element is internal interaction or trigger, for example, interaction or trigger implemented through inter-process communication and function invocation. That is, the Push proxy sends a trigger message through an internal trigger mechanism (such as inter-process communication and function invocation) to trigger the network-side network element to notify the Push proxy when the network-side network element perceives the change of the address of the Push client. If the Push proxy and the network-side network element share data, the steps of interaction or trigger between the Push proxy and the network-side network element may be omitted.

Case 2: The Push client starts the update of the address of the Push client. The specific process is as follows:

(1) The Push proxy receives an address update message sent by the Push client, where the address update message carries the Push identifier of the Push client and a new address after the change which is perceived by the Push client.

(2) The Push proxy queries the stored mapping between the Push identifier and the address of the Push client according to the Push identifier of the Push client and updates the corresponding address in the mapping according to the new address.

Case 3: The network-side network element starts the release of the address of the Push client. The specific process is as follows:

(1) The Push proxy receives an address release message sent by the network-side network element, where the address release message carries the address of the Push client to be released, where the address of the Push client to be released is perceived by the network-side network element.

(2) The Push proxy queries the stored mapping between the Push identifier and the address of the Push client according to the address and marks the address in the mapping as unobtained or as a special value.

The special value may be indicated by 0 or 1. It is used to indicate that the address of the Push client corresponding to the Push identifier is not obtained.

In the scenario of case 3, the Push proxy also needs to inform the network-side network element beforehand that when the network-side network element perceives the change of the address of the Push client, the Push proxy should be notified in time. When the Push proxy and the network-side network element are located on the same device, the interaction or trigger between the Push proxy and the network-side network element is internal interaction or trigger, for example, the Push proxy may send a trigger message through an internal trigger mechanism (such as inter-process communication and function invocation) to trigger the network-side network element to notify the Push proxy when the network-side network element perceives the change of the address of the Push client.

Case 4: The Push client starts the release of the address of the Push client. The specific process is as follows:

(1) The Push proxy receives an address release message sent by the Push client, where the address release message carries the address of the Push client to be released.

(2) The Push proxy queries the stored mapping between the Push identifier and the address of the Push client according to the address and marks the address in the mapping as unobtained or as a special value.

In the embodiment, the network-side network element or the Push client starts the address update operation of the Push client, so that the Push proxy may timely update the address of the Push client in the mapping between the Push identifier and the address of the Push client, to improve the validity and reachability of IP connections.

In the method for cooperation between push devices according to the embodiment of the present invention, the Push proxy may, on the basis of storing the mapping between the Push identifier and the address of the Push client, forward, to the Push client, the Push message sent by the Push server. The specific process is as follows:

(1) The Push proxy receives a Push message sent by the Push server, where the Push message carries the Push identifier of the Push client.

(2) The Push proxy obtains the address of the Push client from the stored mapping between the Push identifier and the address of the Push client according to the Push identifier of the Push client.

(3) The Push proxy sends the Push message to the Push client according to the address of the Push client.

Optionally, before sending the Push message to the Push client, the Push proxy may convert the format of the Push message to adapt to the interface of the Push client. The Push proxy may convert Push messages of different formats sent by different Push servers into Push messages of a unified format, and send the messages to Push clients, so that a Push service is not confined to a particular Push client.

In the method for cooperation between push devices according to the embodiment of the present invention, if the Push client no longer requires the Push service or if the Push client exits a network, the Push client or the network-side network element initiates a deregistration process to the Push server. The deregistration process may include the following scenarios:

Scenario 1: The Push client initiates a deregistration process to the Push server. The process is as follows:

(1) The Push client sends a deregistration request message to the Push server, where the deregistration request message carries at least the Push identifier of the Push client, so that the Push server deletes the context related to the Push identifier of the Push client, for example, it deletes the mapping between the Push identifier of the Push client and the address of the Push proxy.

(2) The Push proxy receives the deregistration request message sent by the Push client, where the deregistration request message carries at least the Push identifier of the Push client.

(3) The Push proxy sends a deregistration request response message to the Push client and deletes the stored mapping between the Push identifier and the address of the Push client.

Scenario 2: The Push client initiates a deregistration process to the Push server. The process is as follows:

(1) The Push proxy receives a deregistration request message sent by the Push client, where the deregistration request message or the data packet header of the message carries at least the Push identifier of the Push client, and optionally may further carry the address of the Push server.

(2) The Push proxy sends the deregistration request message to the Push server.

Optionally, the Push proxy may convert the format of the deregistration request message sent by the Push client, in order to adapt to the interface of the Push server.

(3) The Push proxy receives a deregistration request response message sent by the Push server and sends it to the Push client and deletes the stored mapping between the Push identifier and the address of the Push client.

Scenario 3: The network-side network element initiates a deregistration process to the Push server. The process is as follows:

(1) The Push proxy receives a deregistration request message sent by the network-side network element, where the deregistration request message or the data packet header of the message carries at least the address of the Push client.

(2) After the Push proxy obtains the Push identifier of the Push client from the stored mapping between the Push identifier and the address of the Push client according to the address of the Push client and writes the Push identifier of the Push client into the deregistration request message, the Push proxy sends the deregistration request message to the Push server, so that the Push server deletes the context related to the Push identifier of the Push client, for example, it deletes the mapping between the Push identifier of the Push client and the address of the Push proxy.

(3) The Push proxy receives a deregistration request response message sent by the Push server and deletes the stored mapping between the Push identifier and the address of the Push client.

In the first embodiment, after obtaining the Push identifier and the address of the Push client, the Push proxy may store the mapping between the Push identifier and the address of the Push client; and when the address of the Push client changes, the Push proxy may timely update the address of the Push client stored on the Push proxy. Therefore, the validity and reachability of IP connections of the Push client can be improved, and the real-time performance and reliability of a Push message can be improved. Further, the Push proxy may convert Push messages of different formats sent by different Push servers into Push messages of a unified format and send the messages to Push clients, so that the Push service is not confined to a particular Push client.

Embodiment 2

In the method for cooperation between push devices according to the embodiment, working as a forwarder between a Push server and a Push client, a push proxy may be configured to implement processes including Push registration of the Push client, forwarding of a Push message, update or release of an address of the Push client, Push deregistration, heartbeat simulation by the Push proxy, and notification of network exception. The processes included in the method for cooperation between push devices according to the embodiment are described in detail with reference to the drawings.

Process 1: Push Registration of the Push Client.

Figure 4:
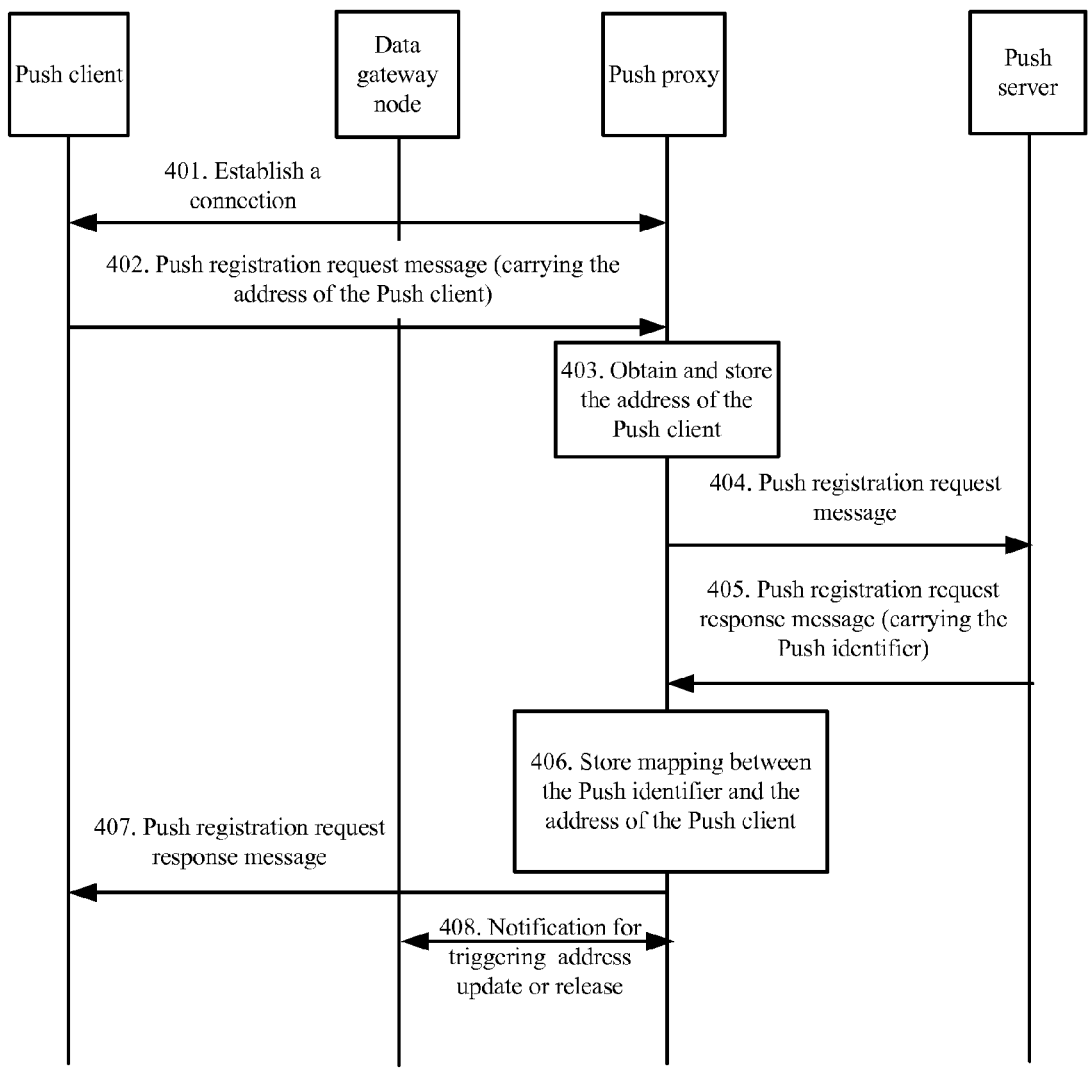
FIG. 4 and FIG. 5 are flowcharts of a Push registration method according to an embodiment of the present invention.

To use a Push service, the Push client first needs to initiate a Push registration process to the Push server. The following registration methods may be available according to whether the Push proxy forwards registration signaling:

Method A: The Push proxy forwards registration signaling. As shown in FIG. 4, the registration process may include the following steps:

401. Establish a connection between a Push client and a Push proxy.

For example, a Transmission Control Protocol (TCP) connection may be established between the Push client and the Push proxy. The address of the Push proxy may be configured on the Push client beforehand, or dynamically discovered by the Push client through the DHCP, DNS, and so on, or determined by the Push server by redirection when the Push client establishes a connection with the Push server.

402. The Push client sends a Push registration request message to the Push proxy, where the Push registration request message or the data packet header of the message carries the address of the Push client and the address of the Push server.

Optionally, the Push registration request sent by the Push client to the Push proxy may further carry the authentication information of the Push client. The authentication information is used to prove the identity of the Push client to the Push server and may include but is not limited to a certificate, an account name, a password, and a message digest generated from key materials.

Optionally, in step 402, the Push client may also send a Push registration request to the Push server, and the Push server redirects the registration request to the corresponding Push proxy.

403. The Push proxy parses the Push registration request message or the data packet header of the message to obtain and store the address of the Push client.

Optionally, if the Push registration request sent by the Push client to the Push proxy further carries authentication information of the Push client, the Push proxy may further obtain and store the authentication information of the Push client.

404. The Push proxy forwards the Push registration request message to the Push server according to the address of the Push server carried in the Push registration request message, where the Push proxy updates the address of the Push client carried in the Push registration request message to the address of the Push proxy.

Optionally, the Push proxy may also directly add the address of the Push proxy to the Push registration request message without the need of deleting or updating the address of the Push client, which does not affect the implementation of the embodiment of the present invention.

Optionally, before forwarding the Push registration request, the Push proxy may convert the format of the Push registration request of the Push client to adapt to the interface of the Push server.

405. After receiving the Push registration request message forwarded by the Push proxy, the Push server sends a Push registration request response message to the Push proxy, where the Push registration request response message carries the Push identifier allocated by the Push server to the Push client. Meanwhile, the Push server stores the mapping between the Push identifier and the address of the Push proxy.

Optionally, if the Push registration request message forwarded by the Push proxy further carries the authentication information of the Push client, then after receiving the Push registration request message forwarded by the Push proxy and authenticating the identity of the Push client as legal according to authentication information of the Push client, the Push server allocates a Push identifier to the Push client, and by using the address of the Push proxy, carries, in the Push registration request response message, the Push identifier allocated to the Push client, and sends the message to the Push proxy.

406. The Push proxy parses the Push registration request response message sent by the Push server and stores the mapping between the Push identifier and the address of the Push client.

Step 406 may be performed after step 407.

407. According to the address of the Push client, the Push proxy forwards, to the Push client, the Push registration request response message sent by the Push server.

Optionally, before forwarding the Push registration request response message sent by the Push server, the Push proxy may convert the format of the Push registration request response message sent by the Push server to adapt to the interface of the Push client.

408. The Push proxy sends a trigger message to a data gateway node, where the trigger message carries the address of the Push client and is used to trigger the data gateway node to notify the Push proxy when the address of the Push client is updated or released.

In addition, the Push proxy may send a trigger message carrying the address of the Push client to network elements, such as the data gateway node, HLR, HSS, and AAA server, where the message is used to trigger the network-side network elements to notify the Push proxy when the Push client exits a network (namely, deregistration).

The sequence of steps 406, 407, and 408 is not limited so long as the steps are executed after step 405.

Figure 5:
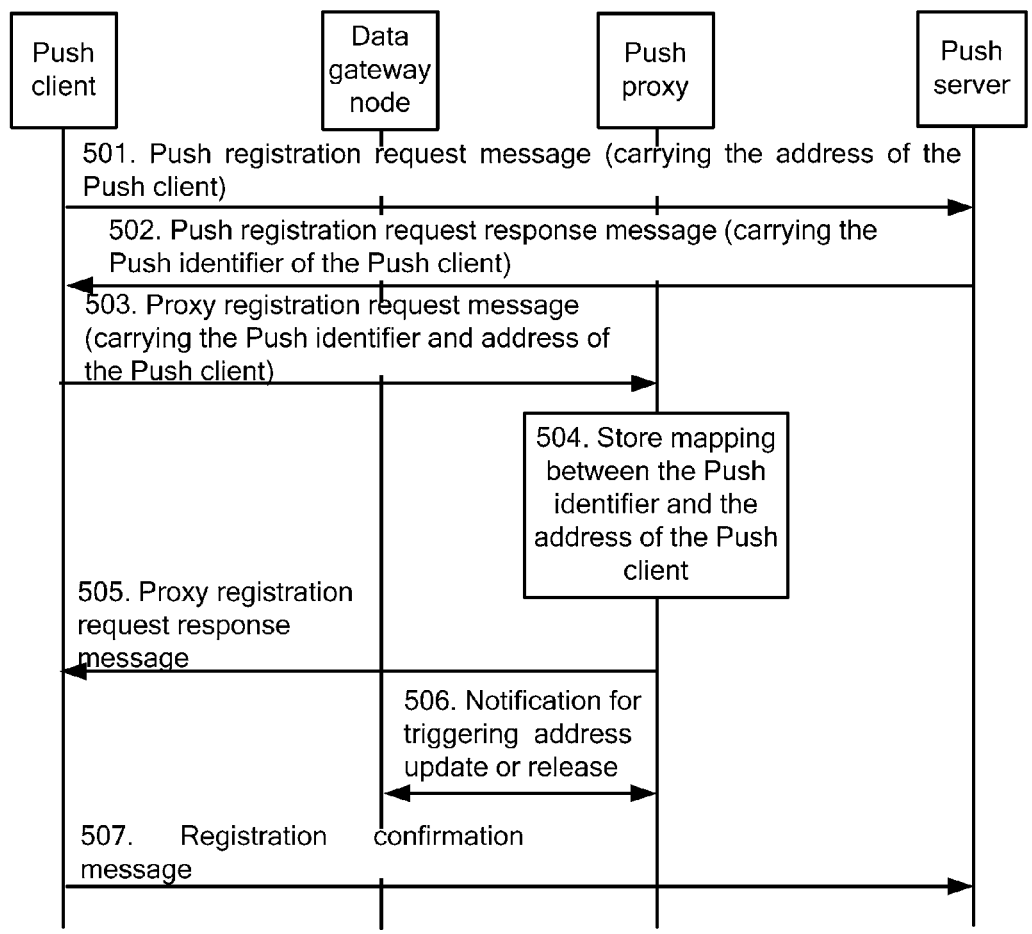

Method B: The Push proxy does not forward registration signaling. As shown in FIG. 5, the registration process may include the following steps:

501. The Push client sends a Push registration request message to the Push server, where the Push registration request message sent by the Push client or the data packet header of the message carries at least the address of the Push client and the address of the Push server.

Optionally, the Push registration request message sent by the Push client in step 501 may further carry the address of the Push proxy. The address of the Push proxy may be configured on the Push client beforehand, or dynamically discovered by the Push client through the DHCP, DNS, and so on.

502. The Push server allocates a Push identifier to the Push client, and returns a Push registration request response message to the Push client, where the Push registration request response message carries the Push identifier allocated by the Push server to the Push client.

Optionally, if the Push registration request message sent by the Push client in step 501 does not carry the address of the Push proxy, the Push registration request response message returned by the Push server to the Push client in step 502 may further carry the address of the Push proxy. The address of the Push proxy is obtained by the Push server by querying a local configuration table according to the address of the Push client carried in the Push registration request message in step 501. Meanwhile, the Push server stores the mapping between the Push identifier allocated to the Push client and the address of the Push proxy.

Optionally, the Push registration request message sent by the Push client in step 501 may further carry the authentication information of the Push client, so that after receiving the Push registration request message sent by the Push client, the Push server authenticates the identity of the Push client as legal according to the authentication information of the Push client and then allocates a Push identifier to the Push client.

503. The Push client sends a proxy registration request message to the Push proxy after obtaining the Push identifier, where the proxy registration request message or the data packet header of the message carries the Push identifier and the address of the Push client.

Optionally, the proxy registration request may carry the authentication information of the Push client.

504. The Push proxy stores mapping between the Push identifier and the address of the Push client.

505. The Push proxy returns a proxy registration request response message to the Push client.

506. The Push proxy sends a trigger message to a data gateway node, where the trigger message carries the address of the Push client and is used to trigger the data gateway node to notify the Push proxy when the address of the Push client is updated or released.

In addition, the Push proxy may send a trigger message carrying the address of the Push client to network elements, such as the data gateway node and HLR/HSS/AAA server, where the message is used to trigger the network-side network elements to notify the Push proxy when a terminal exits the network (namely, deregistration).

The sequence of step 504, 505, and 506 is not limited so long as the steps are executed after step 503.

507. After receiving the Push proxy registration request response, the Push client sends a registration confirmation message to the Push server.

Process 2: Forwarding of a Push Message.

Figure 6:
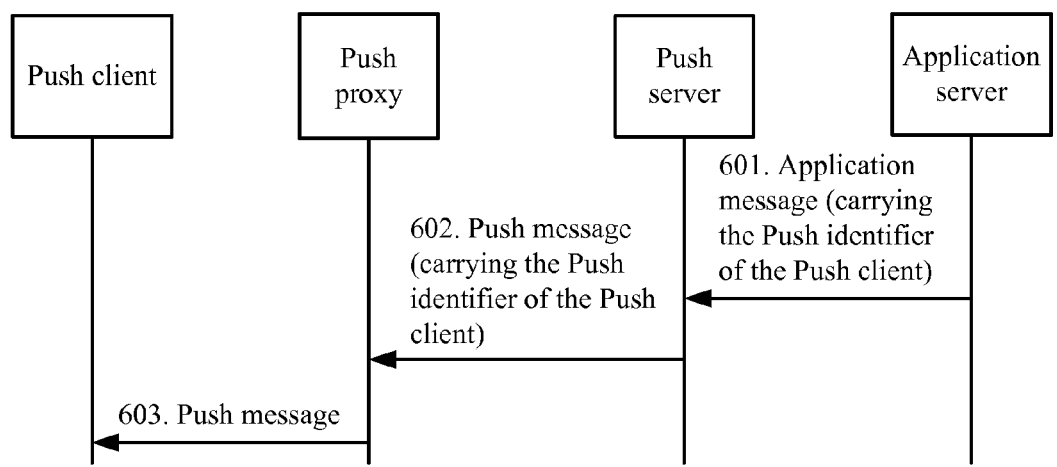
FIG. 6 is a flowchart of a method for forwarding a Push message according to an embodiment of the present invention.

By means of Push registration as described in process 1, the Push proxy may store the mapping between the Push identifier and the address of the Push client, and then the Push proxy may forward, to the Push client, the Push message sent by the Push server. The Push server triggers sending of the Push message by receiving an application message sent by an application server. As shown in FIG. 6, the process of forwarding a Push message is as follows:

601. The application server sends an application message to the Push server, where the application message carries the Push identifier of the Push client.

The address of the Push server and the Push identifier of the Push client may be notified by the Push server to the application server after the Push registration of the Push client is completed.

602. The Push server generates a Push message according to the application message sent by the application server, where the Push message carries the Push identifier of the Push client, and sends the Push message to the Push proxy according to the mapping that is between the Push identifier and the address of the Push proxy and is stored in the registration process.

603. The Push proxy parses the Push identifier in the Push message sent by the Push server, and forwards the Push message to the Push client according to the stored mapping between the Push identifier and the address of the Push client.

Optionally, the Push proxy may convert the format of the Push message sent by the Push server to adapt to the interface of the Push client. Therefore, the Push proxy may convert Push messages of different formats sent by different Push servers into Push messages of a unified format and send the messages to Push clients, so that a Push service is not confined to a particular Push client.

For example, the Push proxy converts a Cloud to Device Messaging (C2DM) Push message sent by a Google C2DM server into a Session Initiation Protocol (SIP) Push message or a Wireless Application Protocol (WAP) Push message and sends the converted message to the Push client.

Process 3: Update or Release of the Address of the Push Client.

By means of Push registration as described in process 1, the Push proxy may store the mapping between the Push identifier and the address of the Push client, and then the Push proxy may timely update the address in the mapping when the address of the Push client is updated or released.

Figure 7:
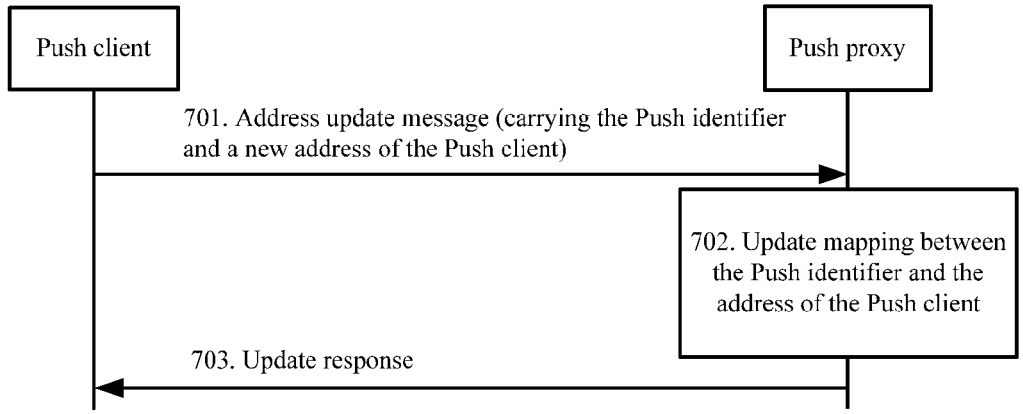
FIG. 7 and FIG. 8 are flowcharts of a method for updating an address of a Push client according to an embodiment of the present invention.

The update of the address of the Push client means that the address of the Push client changes due to the movement of the Push client or other network exception. The following two methods are available for updating the address of the Push client:

Method A: The Push client starts address update:

Method A is as follows: The Push client perceives the change of its address, and actively notifies the Push proxy. As shown in FIG. 7, the method includes the following steps:

701. The Push client perceives the change of its address, and sends an address update message to the Push proxy, where the address update message or the data packet header of the message carries the Push identifier and a new address of the Push client.

702. The Push proxy updates the stored mapping between the Push identifier and the address of the Push client and uses the new address to replace an original address.

703. The Push proxy returns an update response to the Push client.

Figure 8:
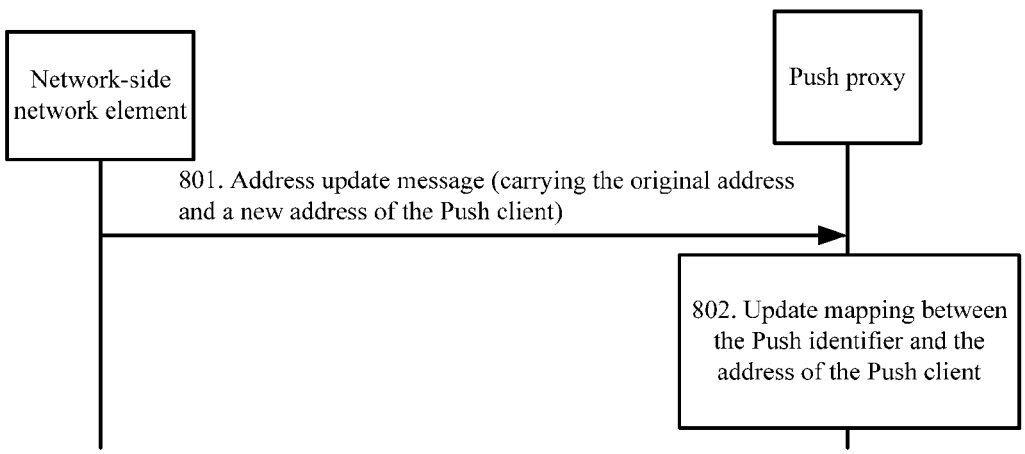

Method B: A network-side network element starts the update of the address of the Push client:

Method B is as follows: A network-side network element (such as a data gateway node) perceives the change of the address of the Push client and notifies the Push proxy. In method B, the network-side network element (such as a data gateway node) needs to receive beforehand a trigger message sent by the Push proxy, where the trigger message is used to trigger the network-side network element to notify the Push proxy when the network-side network element perceives the change of the address of the Push client. If the Push proxy and the network-side network element (such as a data gateway node) share data, no trigger is required. As shown in FIG. 8, the embodiment includes the following steps:

801. The network-side network element sends an address update message to the Push proxy after perceiving the change of the address of the Push client, where the address update message carries the original address of the Push client and the new address after the change, where the original address of the Push client and the new address after the change are perceived by the network-side network element.

802. The Push proxy queries the stored mapping between the Push identifier and the address of the Push client according to the original address of the Push client and updates the corresponding address in the mapping according to the new address.

Figure 9:
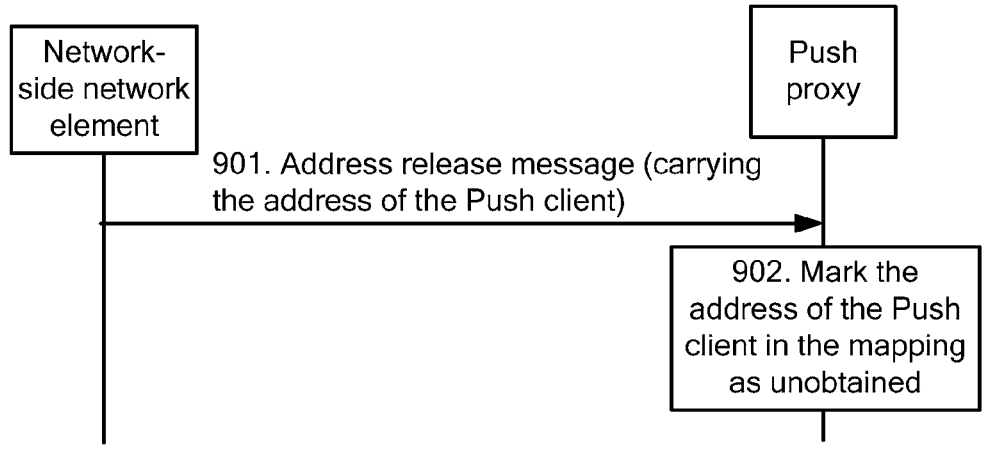
FIG. 9 is a flowchart of a method for releasing an address of a Push client according to an embodiment of the present invention.

Release of the Address of the Push Client:

In the embodiment, the release of the address of the Push client is applicable to a non-LTE network (such as a 3G network), where the release of the address of the Push client does not affect the connection between the Push client and a network-side circuit switched (CS) domain. The following two methods are available for releasing the address of the Push client:

Method A: A network-side network element starts the release of the address of the Push client:

In method A, the network-side network element (such as a data gateway node) needs to receive beforehand a trigger message sent by the Push proxy, where the trigger message is used to trigger the network-side network element to notify the Push proxy when the network-side network element perceives the change of the address of the Push client. If the Push proxy and the network-side network element (such as a data gateway node) share data, no trigger is required. As shown in FIG. 9, the embodiment includes the following steps:

901. The network-side network element sends an address release message to the Push proxy after perceiving release of all Packet Data Protocols (PDP) or the address of the Push client, where the address release message carries the address of the Push client perceived by the network-side network element.

902. The Push proxy queries the stored mapping between the Push identifier and the address of the Push client according to the address of the Push client carried in the address release message and marks the address in the mapping as unobtained or as a special value.

Method B: The Push client starts address release, which includes the following steps:

(1) The Push client sends an address release message to the Push proxy, where the address release message carries the address of the Push client.

(2) The Push proxy updates the stored mapping between the Push identifier and the address of the Push client and marks the address of the Push client in the mapping as unobtained or as a special value.

Process 4: Push Deregistration of the Push Client.

Figure 10:
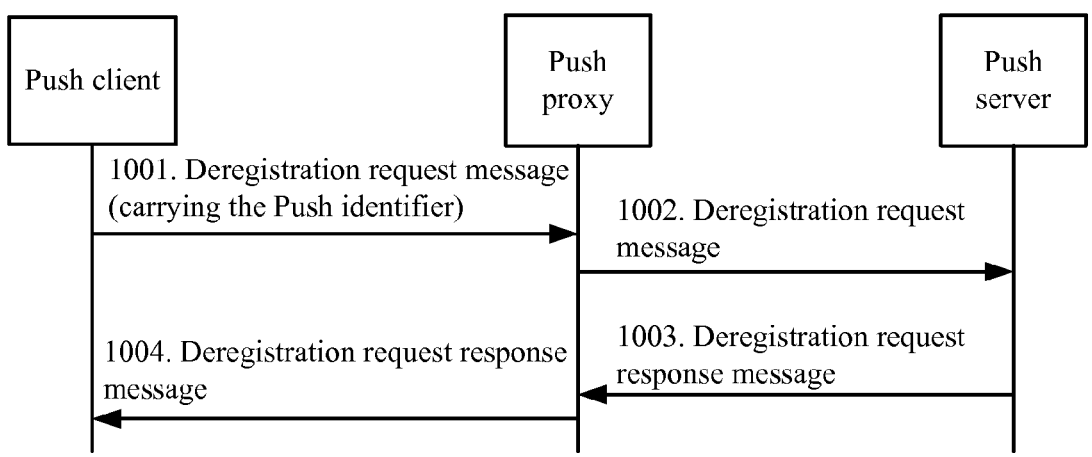
FIG. 10 to FIG. 12 are flowcharts of a Push deregistration method according to an embodiment of the present invention.

By means of Push registration as described in process 1, the Push proxy may store the mapping between the Push identifier and the address of the Push client. If the Push client no longer requires the Push service or if the Push client exits the network, the Push client or the network-side network element may initiate a deregistration process to the Push server. Considering whether the Push proxy works as a forwarder and considering different initiators of the deregistration process, the following methods are available:

Method A: The Push client initiates a Push deregistration process, and the Push proxy forwards deregistration signaling. As shown in FIG. 10, the Push deregistration process of method A may include the following steps:

1001. The Push client sends a deregistration request message to the Push proxy, where the deregistration request message or the data packet header of the message carries a push identifier of the Push client, or optionally may further carry an address of the Push server.

1002. The Push proxy sends a deregistration request message to the Push server.

Optionally, the Push proxy may convert the format of the deregistration request message sent by the Push client to adapt to the interface of the Push server, so that the Push client can interact with different Push servers and that a Push service is not confined to a particular Push client.

1003. The Push server returns a deregistration request response message to the Push proxy.

1004. The Push proxy forwards the deregistration request response message to the Push client and deletes the stored mapping between the Push identifier and the address of the Push client.

Optionally, the Push proxy may convert the format of the deregistration request response message returned by the Push server to adapt to the interface of the Push client, so that different Push servers can interact with the Push client and that a Push service is not confined to a particular Push server.

Figure 11:
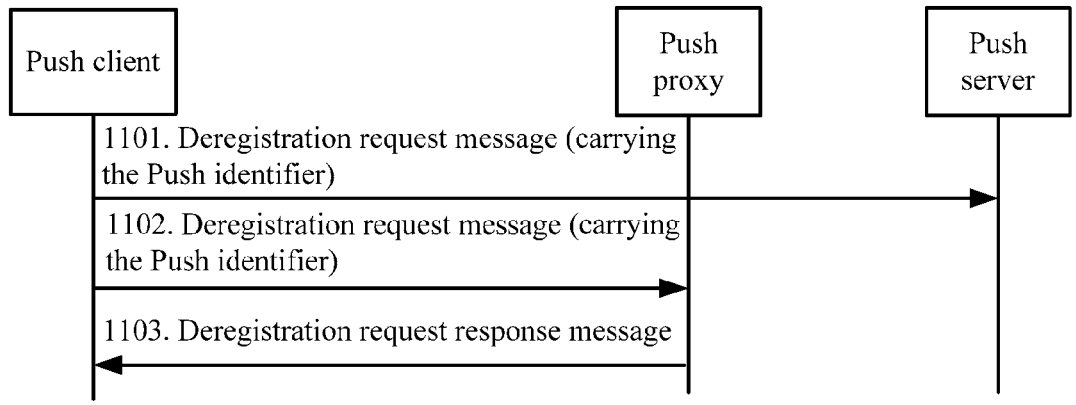

Method B: The Push client initiates a Push deregistration process, and the Push proxy does not forward deregistration signaling. As shown in FIG. 11, the Push deregistration process of method B may include the following steps:

1101. The Push client sends a deregistration request message to the Push server, where the deregistration request message carries the Push identifier of the Push client, so that the Push server deletes the context related to the Push identifier of the Push client, for example, it deletes the mapping between the Push identifier of the Push client and the address of the Push proxy.

1102. The Push client sends a deregistration request message to the Push proxy, where the deregistration request message carries the Push identifier of the Push client.

1103. The Push proxy sends a deregistration request response message to the Push client and deletes the stored mapping between the Push identifier and the address of the Push client.

Figure 12:
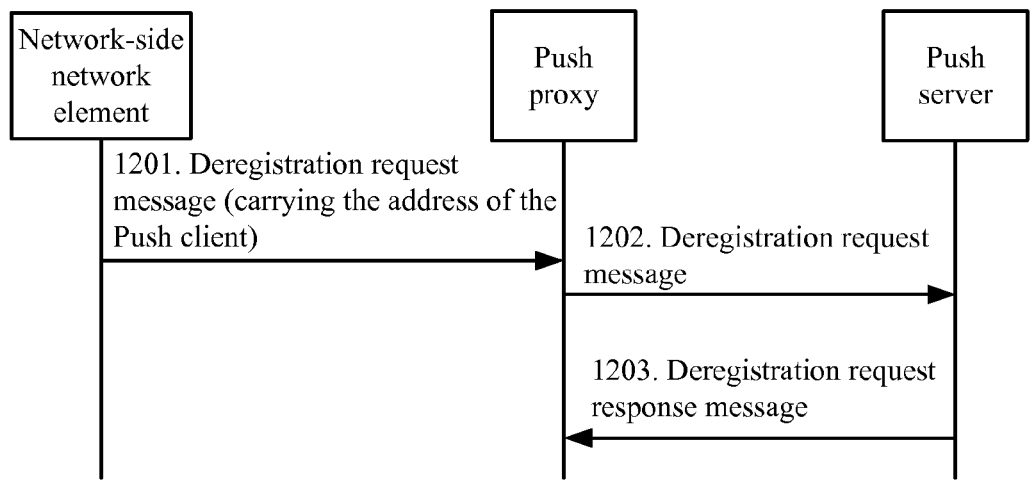

Method C: The network-side network element initiates a Push deregistration process:

In method C, the network-side network element (such as a data gateway node) needs to receive beforehand a trigger message sent by the Push proxy, where the trigger message is used to notify the Push proxy when the network-side network element perceives that the Push client exits a network. If the Push proxy and the network-side network element (such as a data gateway node) share data, no trigger is required. As shown in FIG. 12, the Push deregistration process of method C may include the following steps:

1201. The network-side network element sends a deregistration request message to the Push proxy when discovering that the Push client exits the network, where the deregistration request message carries the address of the Push client.

1202. After the Push proxy obtains the Push identifier of the Push client from the stored mapping between the Push identifier and the address of the Push client according to the address of the Push client and writes the Push identifier of the Push client into the deregistration request message, the Push proxy sends the deregistration request message to the Push server, so that the Push server deletes the context related to the Push identifier of the Push client, for example, it deletes the mapping between the Push identifier of the Push client and the address of the Push proxy.

1203. The Push server returns a deregistration request response message to the Push proxy and the Push proxy deletes the mapping between the Push identifier and the address of the Push client.

Optionally, the Push proxy may delete the authentication information of the Push client.

Process 5: Heartbeat Simulation by the Push Proxy.

When the Push proxy stores the authentication information of the Push client and the Push client has registered with the Push server, the Push proxy may simulate the Push client to periodically send a heartbeat packet to the Push server, so as to comply with the existing mechanism of the Push server.

Process 6: Notification of Network Exception.

When the Push proxy receives the Push message that is sent by the Push server to the Push client, if the Push proxy discovers that the Push client corresponding to the Push identifier in the Push message is located in a busy or exceptional network area, the Push proxy returns a busy or exception response to the Push server, so that the Push server performs the corresponding processing.

Before this, the Push proxy may interact with the data gateway node to obtain network area identifiers corresponding to the address of the Push client, where the network area identifiers may be addresses of network elements connecting to the data gateway node, such as a Serving GPRS Support Node (SGSN) or gateway (GW). The Push proxy interacts with a network state database according to the network area identifiers to obtain the states of network areas, such as busy/idle/exceptional. To be specific, the states may be obtained periodically, or the network state database is triggered by an event to report the states to the Push proxy.

In the method for cooperation between push devices according to the embodiment, after obtaining the Push identifier and the address of the Push client, the Push proxy may store the mapping between the Push identifier and the address of the Push client; and when the address of the Push client changes, the Push proxy may timely update the address of the Push client stored on the Push proxy, without a heartbeat operation. Therefore, the validity and reachability of IP connections of the Push client can be improved, and the real-time performance and reliability of Push messages can be improved. In addition, eliminating the heartbeat between the Push client and the Push server can save energy of the Push client and network-side resources. This is because in a wireless network, the Push client needs to switch from an idle state to an active state intermittently so as to send heartbeat packets, and frequent heartbeats need to consume plenty of energy of the Push client and network-side resources, and especially network-side signaling storms may be caused when there are a huge number of Push clients. Further, the Push proxy may convert Push messages of different formats sent by different Push servers into Push messages of a unified format and send the messages to Push clients, so that a Push service is not confined to a particular Push client.

Embodiment 3

Figure 13:
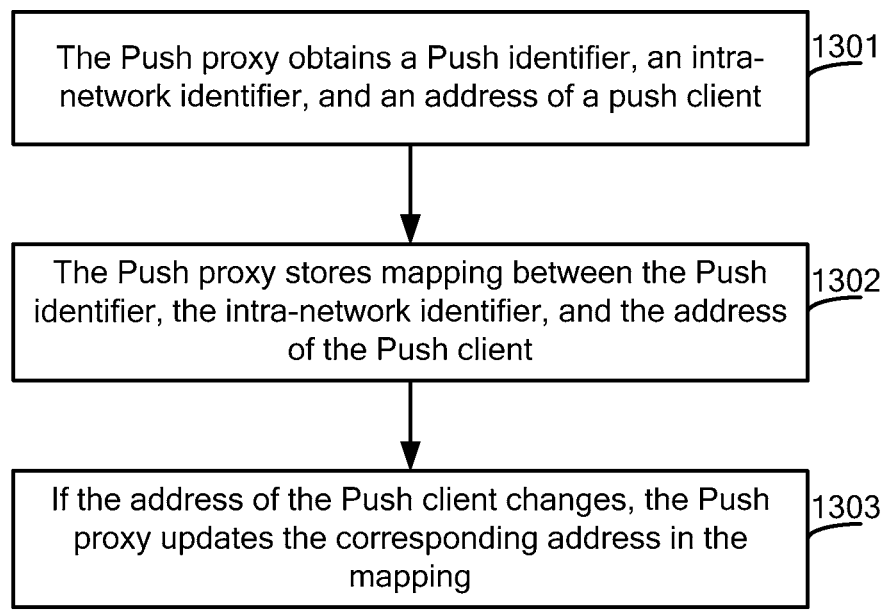
FIG. 13 is a flowchart of another method for cooperation between push devices according to an embodiment of the present invention.

FIG. 13 is a flowchart of another method for cooperation between push devices according to an embodiment of the present invention. As shown in FIG. 13, the method may include the following steps:

1301. A Push proxy obtains a Push identifier, an intra-network identifier, and an address of a Push client.

In the embodiment, the address of the Push client may be either the IP address of the Push client, or an IP address and a port.

The intra-network identifier of the Push client includes but is not limited to an international mobile subscriber identity (IMSI), a mobile station ISDN (MSISDN), and a network access identifier.

1302. The Push proxy stores mapping between the Push identifier, the intra-network identifier, and the address of the Push client.

1303. If the address of the Push client changes, the Push proxy updates the corresponding address in the mapping.

In the embodiment, the Push proxy may obtain the Push identifier, intra-network identifier, and address of the Push client as follows:

Method 1:

(1) The Push proxy receives a Push registration request message sent by the Push client, where the Push registration request message or the data packet header of the message carries the address of the Push client and may further carry the address of a Push server.

(2) The Push proxy parses the Push registration request message or the data packet header of the message to obtain the address of the Push client, and queries the corresponding intra-network identifier from a network-side network element according to the obtained address of the Push client, where the network-side network element is a data gateway node, an HLR, an HSS, or an AAA server.

(3) The Push proxy sends the Push registration request message to the Push server.

(4) The Push proxy receives a Push registration request response message sent by the Push server, where the Push registration request response message carries a Push identifier allocated by the Push server to the Push client.

(5) The Push proxy parses the Push registration request response message to obtain the Push identifier of the Push client.

Method 2:

(1) The Push proxy receives a Push registration request message sent by the Push client, where the Push registration request message or the data packet header of the message carries the Push identifier, intra-network identifier, and address of the Push client.

(2) The Push proxy parses the Push registration request or the data packet header of the message to obtain the Push identifier, intra-network identifier, and address of the Push client.

Method 3:

(1) The Push proxy receives a Push client network entry notification sent by the network-side network element, where the Push client network entry notification carries the address and intra-network identifier of the Push client; the network-side network element is a data gateway node, an HLR, an HSS, or an AAA server.

(2) The Push proxy queries the authentication information of the Push client and the address of the Push server locally or obtains the authentication information of the Push client and the address of the Push server from a user information database according to the intra-network identifier, and sends a Push registration request message to the Push server.

(3) The Push proxy receives a Push registration request response message sent by the Push server, where the Push registration request response message carries a Push identifier allocated by the Push server to the Push client.

(4) The Push proxy parses the Push registration request response message to obtain the Push identifier of the Push client.

In the embodiment, if the address of the Push client changes, the Push proxy may update the address in the mapping as follows:

(1) The Push proxy receives an address update message sent by the network-side network element, where the address update message carries the intra-network identifier of the Push client and a new address of the Push client after the change and the new address of the Push client after the change is perceived by the network-side network element.

The network-side network element is a data gateway node, an HLR, an HSS, or an AAA server.

(2) The Push proxy queries the stored mapping between the Push identifier, the intra-network identifier, and the address of the Push client according to the intra-network identifier and updates the corresponding address in the mapping according to the new address.

In the method for cooperation between push devices according to the embodiment, after obtaining the Push identifier, intra-network identifier, and address of the Push client, the Push proxy may store the mapping between the Push identifier, the intra-network identifier, and the address of the Push client; and when the address of the Push client changes, the Push proxy may timely update the address of the Push client stored on the Push proxy, without a heartbeat operation. Therefore, the validity and reachability of IP connections of the Push client can be improved, and the real-time performance and reliability of Push messages can be improved.

Embodiment 4

In the method for cooperation between push devices according to the embodiment, working as a forwarder between a Push server and a Push client, a Push proxy may implement processes according to the intra-network identifier of the Push client, including Push registration of the Push client, forwarding of a Push message, update or release of the address of the Push client, Push deregistration, heartbeat simulation by the Push proxy, and notification of network exception, which enriches the function of the Push proxy. The processes included in the method for cooperation between push devices according to the embodiment are described in detail with reference to the drawings.

Process 1: Push Registration of the Push Client.

Figure 14:
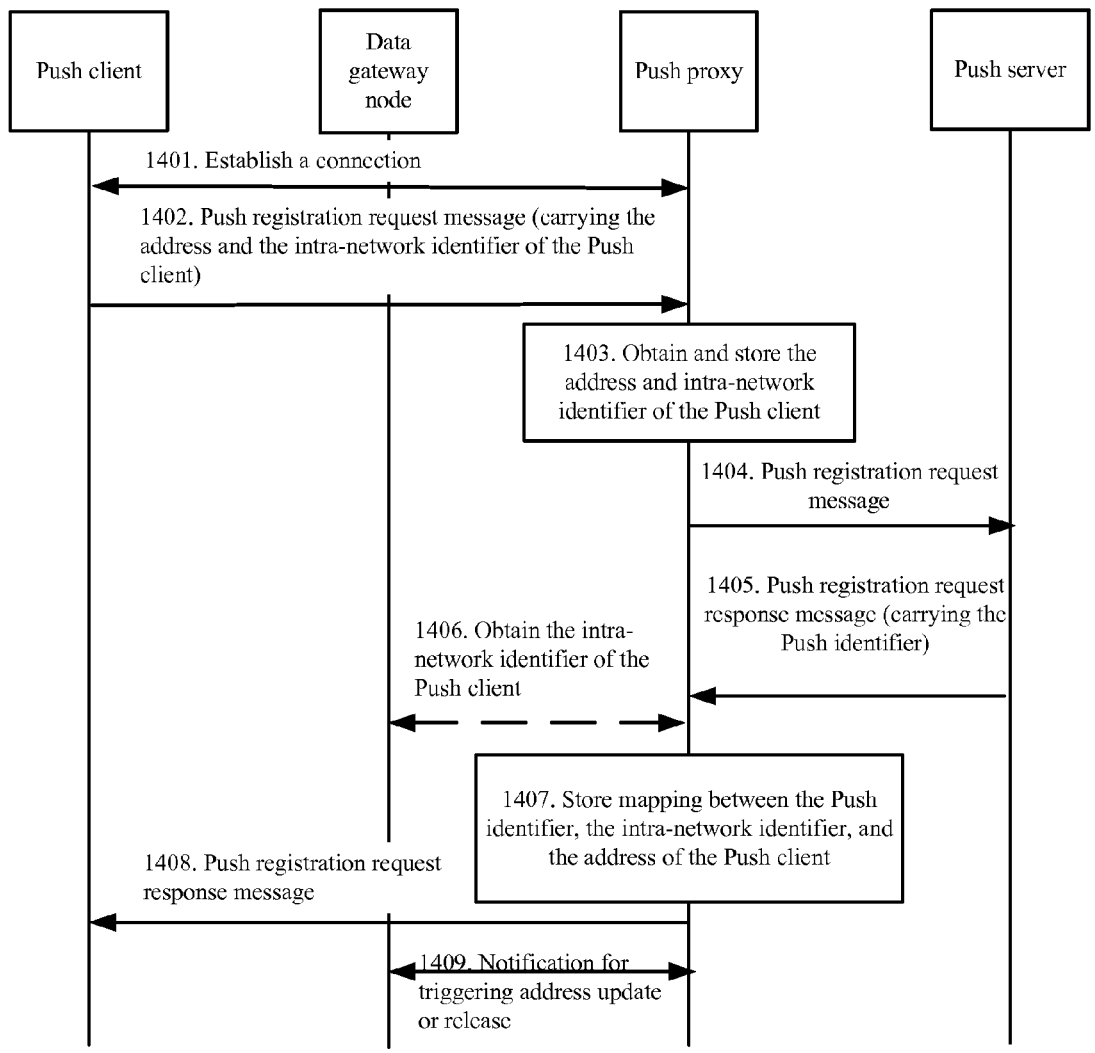
FIG. 14 to FIG. 16 are flowcharts of a Push registration method according to an embodiment of the present invention.

Method A: The Push proxy forwards registration signaling. As shown in FIG. 14, the registration process may include the following steps:

1401. Same as step 401 in the second embodiment.

1402. The Push client sends a Push registration request message to the Push proxy, where the Push registration request message or the data packet header of the message carries the address and intra-network identifier of the Push client and the address of the Push server, where the intra-network identifier may be carried optionally.

1403. The Push proxy parses the Push registration request message or the data packet header of the message to obtain and store the address and intra-network identifier of the Push client.

1404. The Push proxy sends the Push registration request message to the Push server according to the address of the Push server; before this, if the Push registration request message carries an intra-network identifier, the Push proxy deletes the intra-network identifier.

1405. After receiving the Push registration request message forwarded by the Push proxy, the Push server sends a Push registration request response message to the Push proxy, where the Push registration request response message carries a Push identifier allocated by the Push server to the Push client. Meanwhile, the Push server stores the mapping between the Push identifier and the address of the Push proxy.

1406. If the Push proxy has not obtained the intra-network identifier of the Push client, the Push proxy queries the intra-network identifier from a data gateway node and interacts with the data gateway node; in the interaction process, the Push proxy sends the address of the Push client to the data gateway node, and the data gateway node returns the corresponding intra-network identifier.

If the Push proxy has obtained the intra-network identifier of the Push client through the foregoing step, step 1406 may be omitted.

1407. The Push proxy parses the Push registration request response message sent by the Push server and stores the mapping between the Push identifier, the intra-network identifier, and the address of the Push client.

1408. According to the address of the Push client, the Push proxy forwards, to the Push client, the Push registration request response message sent by the Push server.

1409. The Push proxy sends a trigger message to the data gateway node, where the trigger message carries the intra-network identifier of the Push client and is used to trigger the data gateway node to notify the Push proxy when the address of the Push client is updated or released.

In addition, the Push proxy may send a trigger message carrying the intra-network identifier of the Push client to network elements, such as the data gateway node and HLR/HSS/AAA, where the message is used to trigger the network-side network elements to notify the Push proxy when the Push client exits a network (namely, deregistration).

Figure 15:
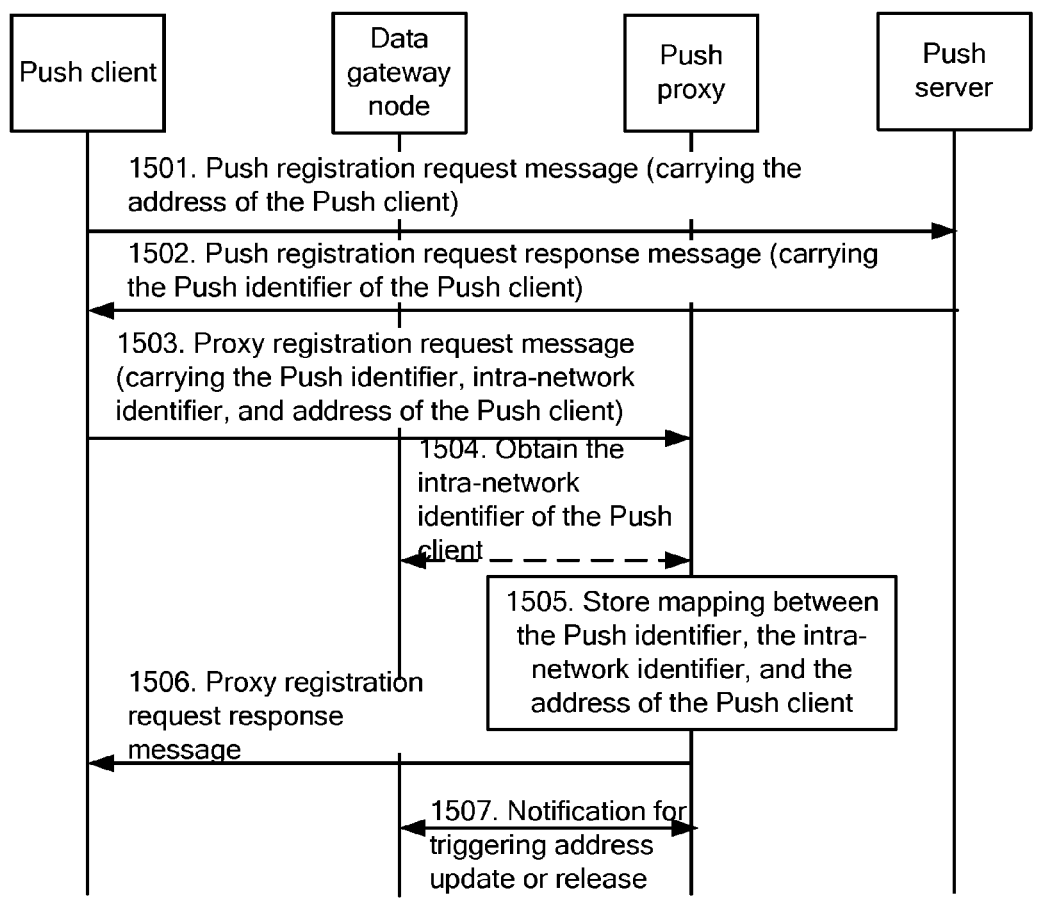

Method B: The Push proxy does not forward registration signaling. As shown in FIG. 15, the registration process may include the following steps:

1501. Same as step 501 in the second embodiment.

1502. Same as step 502 in the second embodiment.

1503. The Push client sends a proxy registration request message to the Push proxy after obtaining the Push identifier, where the proxy registration request message or the data packet header of the message carries the Push identifier, intra-network identifier, and address of the Push client, where the intra-network identifier may be carried optionally.

1504. If the Push proxy has not obtained the intra-network identifier of the Push client, the Push proxy queries the intra-network identifier from the data gateway node and interacts with the data gateway node; in the interaction process, the Push proxy sends the address of the Push client to the data gateway node, and the data gateway node returns the corresponding intra-network identifier.

If the Push proxy has obtained the intra-network identifier of the Push client through the foregoing step, step 1504 may be omitted.

1505. The Push proxy stores mapping between the Push identifier, the intra-network identifier, and the address of the Push client.

1506. The Push proxy returns a proxy registration request response message to the Push client.

1507. The Push proxy sends a trigger message to the data gateway node, where the trigger message carries the intra-network identifier of the Push client and is used to trigger the data gateway node to notify the Push proxy when the address of the Push client is updated or released.

In addition, the Push proxy may send a trigger message carrying the intra-network identifier of the Push client to network elements, such as the data gateway node and HLR/HSS/AAA, where the message is used to trigger the network-side network elements to notify the Push proxy when the terminal exits a network (namely, deregistration).

Figure 16:
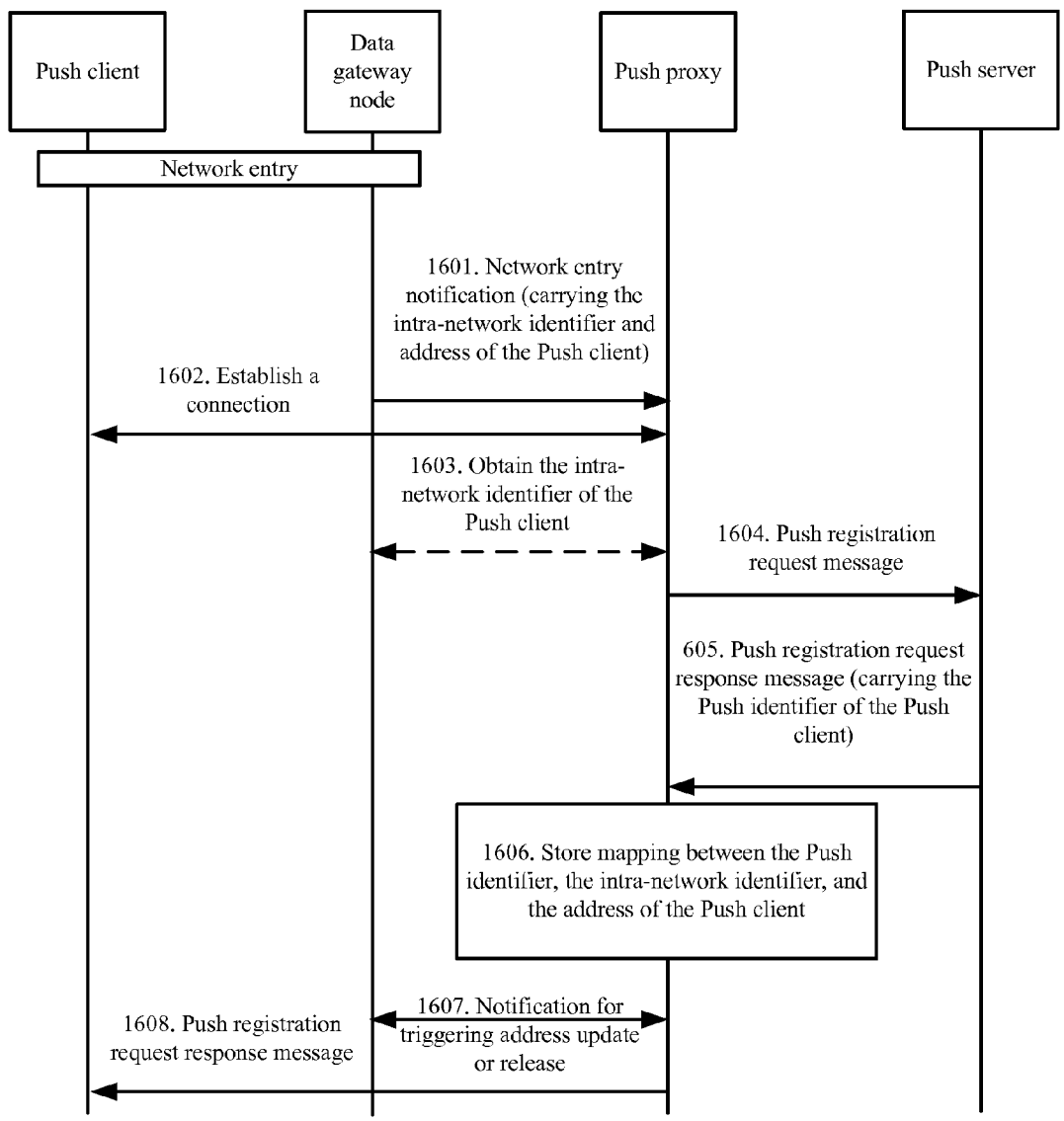

Method C: The Push proxy initiates Push registration. As shown in FIG. 16, the registration process may include the following steps:

1601. The Push client enters the network; the data gateway node allocates an address to the Push client, and sends a Push client network entry notification to the Push proxy, where the notification carries the intra-network identifier and address of the Push client.

The address of the Push proxy may be configured on the data gateway node beforehand.

1602. Establish a connection between the Push client and the Push proxy.

For example, a TCP connection is established between the Push client and the Push proxy.

1603. If the Push proxy has not obtained the intra-network identifier of the Push client, the Push proxy queries the intra-network identifier from the data gateway node and interacts with the data gateway node; in the interaction process, the Push proxy sends the address of the Push client to the data gateway node, and the data gateway node returns the corresponding intra-network identifier.

If the Push proxy has obtained the intra-network identifier of the Push client through the foregoing step, step 1603 may be omitted.

1604. After the Push proxy learns that the Push client enters the network or the connection is established between the Push client and the Push proxy, the Push proxy queries the address of the Push server locally or obtains the address of the Push server from the user information database according to the obtained intra-network identifier, and sends a Push registration request message to the Push server.

Optionally, the Push registration request message sent by the Push proxy may further carry the authentication information of the Push client.

1605. After receiving the Push registration request message sent by the Push proxy, the Push server sends a Push registration request response message to the Push proxy, where the Push registration request response message carries a Push identifier allocated by the Push server to the Push client.

Optionally, if the Push registration request message sent by the Push proxy in step 1604 further carries the authentication information of the Push client, then in step 1605, the Push server first authenticates the identity of the Push client as legal and sends, to the Push proxy, the Push registration request response message carrying the Push identifier.

1606. The Push proxy stores mapping between the Push identifier, the intra-network identifier, and the address of the Push client.

1607. Same as step 1507.

1608. The Push proxy forwards the Push registration request response message to the Push client.

Process 2: Forwarding of a Push Message.

Figure 17:
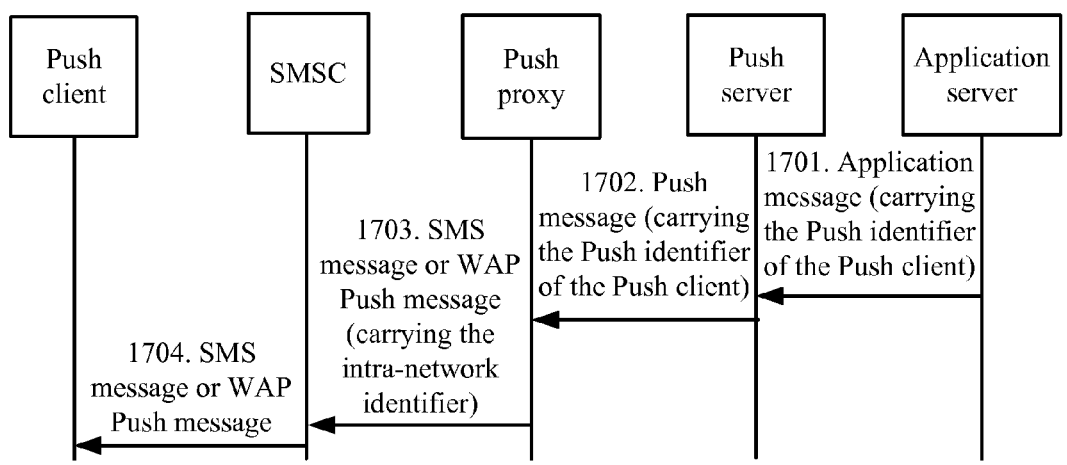
FIG. 17 is a flowchart of another method for forwarding a Push message according to an embodiment of the present invention.

As shown in FIG. 17, the process of forwarding a Push message is as follows:

1701. Same as step 601.

1702. Same as step 602.

1703. The Push proxy converts the Push message into a short message service (SMS) message or a WAP Push message, and sends the converted message to a short message service center (SMSC) or a WAP Push proxy gateway, where the SMS message or WAP Push message carries an intra-network identifier corresponding to the Push identifier.

The address of the SMSC or WAP proxy gateway on the Push proxy is preconfigured.

1704. The SMSC or WAP proxy gateway sends the SMS message or WAP Push message to the Push client.

Process 3: Address Update or Release of the Push Client.

By means of Push registration as described in process 1, the Push proxy may store the mapping between the Push identifier, the intra-network identifier, and the address of the Push client, and then the Push proxy may timely update the address in the mapping when the address of the Push client is updated or released. The following two methods are available for updating the address of the Push client:

Method A: The Push Client Starts Address Update:

Method A is as follows: The Push client perceives the change of its address and actively notifies the Push proxy as follows:

(1) The Push client perceives the change of its address, and sends an address update message to the Push proxy, where the address update message carries the Push identifier, intra-network identifier, and new address of the Push client.

(2) The Push proxy updates the stored mapping between the Push identifier, the intra-network identifier, and the address and uses the new address to replace an original address.

(3) The Push proxy returns an update response to the Push client.

Method B: A Network-Side Network Element Starts the Update of the Address of the Push Client:

Method B is as follows: A network-side network element (such as a data gateway node) perceives the change of the address of the Push client and notifies the Push proxy. In method B, the network-side network element (such as a data gateway node) needs to receive beforehand a trigger message sent by the Push proxy, where the trigger message is used to trigger the network-side network element to notify the Push proxy when the network-side network element perceives the change of the address of the Push client. If the Push proxy and the network-side network element (such as a data gateway node) share data, no trigger is required. The specific process is as follows:

1. The network-side network element sends an address update message to the Push proxy after perceiving the change of the address of the Push client, where the address update message carries the intra-network identifier of the Push client and the new address after the change, where the intra-network identifier of the Push client and the new address after the change are perceived by the network-side network element.

(2) The Push proxy queries the stored mapping between the Push identifier, the intra-network identifier, and the address of the Push client according to the intra-network identifier of the Push client and updates the corresponding address in the mapping according to the new address.

Address Release of the Push Client:

In the embodiment, the release of the address of the Push client does not affect the connection between the Push client and a network-side CS domain. The release of the address of the Push client is as follows:

(1) The network-side network element sends an address release message to the Push proxy after perceiving release of all PDPs or the address of the Push client, where the address release message carries the intra-network identifier of the Push client perceived by the network-side network element.

(2) The Push proxy queries the stored mapping between the Push identifier, the intra-network identifier, and the address of the Push client according to the intra-network identifier of the Push client carried in the address release message and marks the address in the mapping as unobtained or as a special value.

Process 4: Push Deregistration of the Push Client.

The specific process of Push deregistration of the Push client is as follows:

(1) The Push client sends a deregistration request message to the Push proxy, where the deregistration request message or the data packet header of the message carries the intra-network identifier of the Push client and the address of the Push server.

(2) The Push proxy sends a deregistration request to the Push server according to the address of the Push server carried in the deregistration request message or the data packet header of the message.

Optionally, the Push proxy may convert the format of the deregistration request message sent by the Push client to adapt to the interface of the Push server, so that the Push client can interact with different Push servers and that a Push service is not confined to a particular Push client.

(3) The Push server returns a deregistration request response message to the Push proxy.

(4) The Push proxy forwards the deregistration request response message to the Push client and deletes the stored mapping between the Push identifier, the intra-network identifier, and the address of the Push client.

Optionally, the Push proxy may convert the format of the deregistration request response message returned by the Push server to adapt to the interface of the Push client, so that different Push servers can interact with the Push client and that a Push service is not confined to a particular Push server.

In the method for cooperation between push devices according to the embodiment, after obtaining the Push identifier, intra-network identifier, and address of the Push client, the Push proxy may store the mapping between the Push identifier, the intra-network identifier, and the address of the Push client; and when the address of the Push client changes, the Push proxy may timely update the address of the Push client stored on the Push proxy, without a heartbeat operation. Therefore, the validity and reachability of IP connections of the Push client can be improved, and the real-time performance and reliability of Push messages can be improved. In addition, eliminating the heartbeat between the Push client and the Push server can save energy of the Push client and network-side resources. Further, the Push proxy may convert Push messages of different formats sent by different Push servers into Push messages of a unified format and send the messages to Push clients, so that a Push service is not confined to a particular Push client.

Embodiment 5

Figure 18:
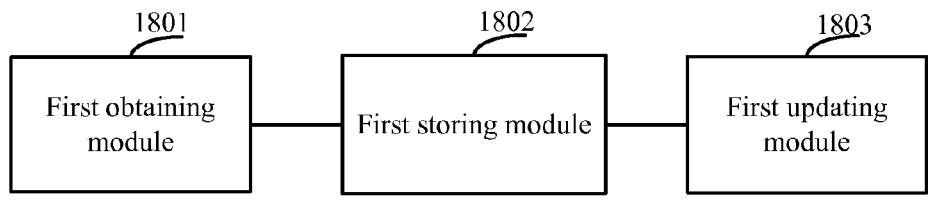
FIG. 18 to FIG. 26 are structural diagrams of an apparatus for cooperation between push devices according to an embodiment of the present invention.

FIG. 18 is a structural diagram of an apparatus for cooperation between push devices according to an embodiment of the present invention, where the apparatus is configured to implement the function of the Push proxy in the foregoing first and second embodiments. As shown in FIG. 18, the cooperation apparatus may include: a first obtaining module 1801 configured to obtain a Push identifier and an address of a Push client; a first storing module 1802 configured to store mapping between the Push identifier and the address of the Push client; and a first updating module 1803 configured to update the corresponding address in the mapping if the address of the Push client changes.

In the embodiment, the address of the Push client may be either an IP address of the Push client, or an IP address and a port.

Figure 19:
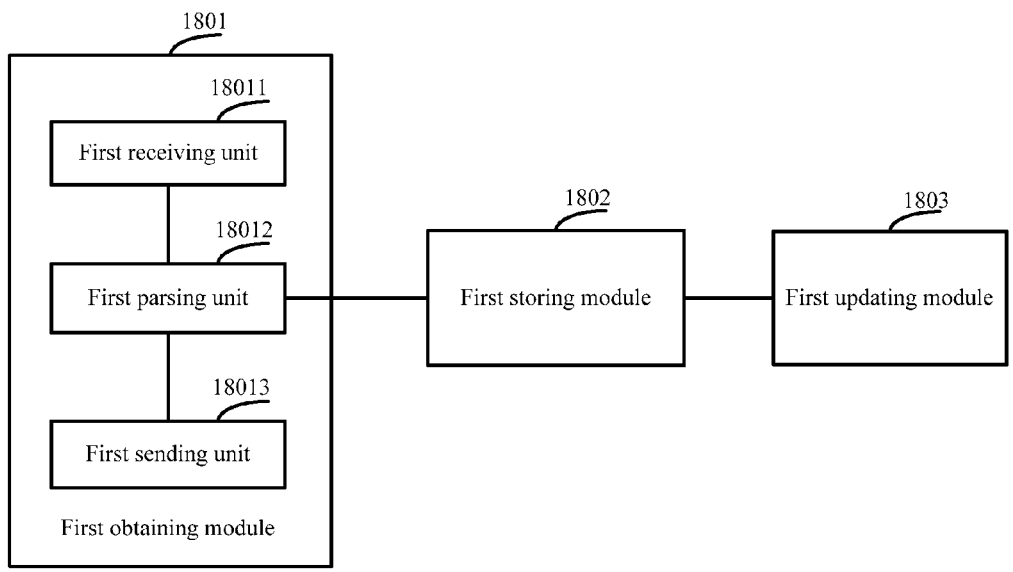

FIG. 19 is a structural diagram of another apparatus for cooperation between push devices according to an embodiment of the present invention. The cooperation apparatus shown in FIG. 19 is obtained after the cooperation apparatus shown in FIG. 18 is optimized, where the first obtaining module 1801 may include: a first receiving unit 18011 configured to receive a Push registration request message sent by the Push client, where the Push registration request message or the data packet header of the message carries the address of the Push client, and may further carry the address of a Push server optionally; a first parsing unit 18012 configured to parse the Push registration request message or the data packet header of the message to obtain the address of the Push client; and a first sending unit 18013 configured to send the Push registration request message to the Push server.

The first receiving unit 18011 is further configured to receive a Push registration request response message sent by the Push server, where the Push registration request response message carries a Push identifier allocated by the Push server to the Push client.

Accordingly, the first parsing unit 18012 is further configured to parse the Push registration request response message to obtain the Push identifier of the Push client.

Accordingly, the first storing module 1802 may be configured to store the mapping between the Push identifier and the address of the Push client obtained by the first parsing unit 18012.

Figure 20:
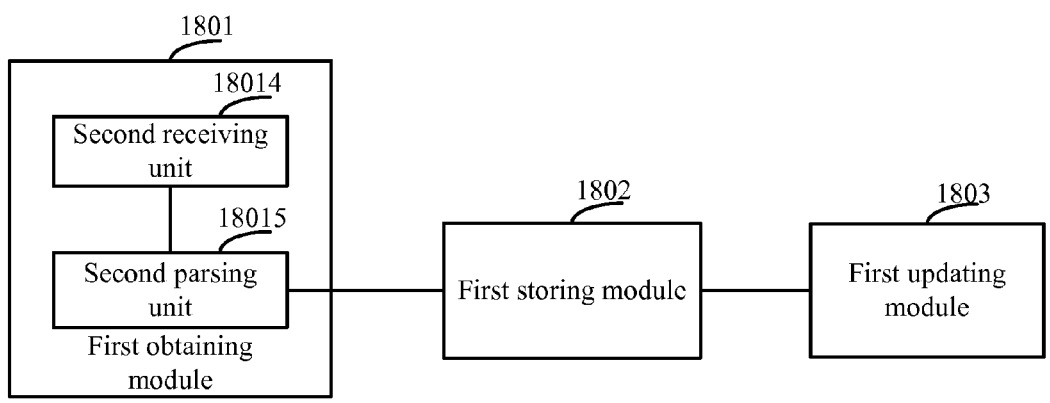

FIG. 20 is a structural diagram of another apparatus for cooperation between push devices according to an embodiment of the present invention. The cooperation apparatus shown in FIG. 20 is obtained after the cooperation apparatus shown in FIG. 18 is optimized, where the first obtaining module 1801 may include: a second receiving unit 18014 configured to receive a proxy registration request message sent by the Push client, where the proxy registration request message or the data packet header of the message carries the Push identifier and the address of the Push client; and a second parsing unit 18015 configured to parse the proxy registration request message or the data packet header of the message to obtain the Push identifier and address of the Push client.

Accordingly, the first storing module 1802 may be configured to store the mapping between the Push identifier and the address of the Push client obtained by the second parsing unit 18015.

Figure 21:
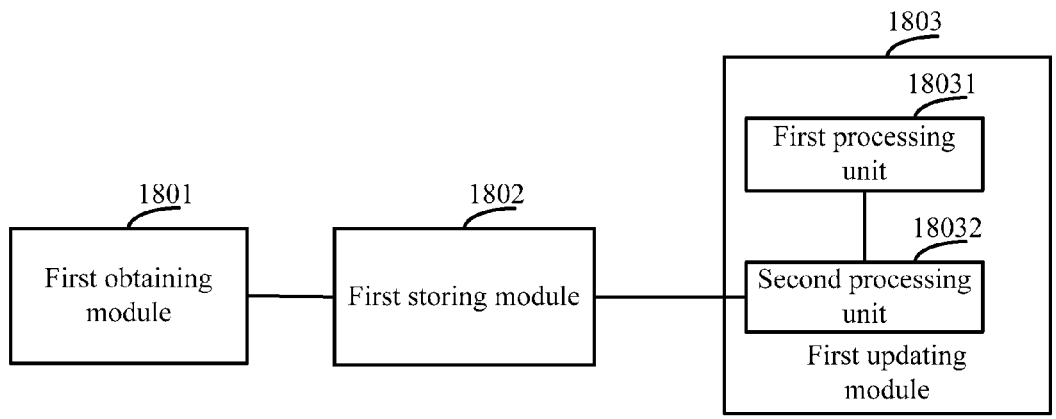

FIG. 21 is a structural diagram of another apparatus for cooperation between push devices according to an embodiment of the present invention. The cooperation apparatus shown in FIG. 21 is obtained after the cooperation apparatus shown in FIG. 18 is optimized, where the first updating module 1803 may include: a first processing unit 18031 configured to receive an address update message sent by a network-side network element, where the address update message carries an original address of the Push client and a new address after the change, where the original address of the Push client and the new address after the change are perceived by the network-side network element; where the network-side network element in the embodiment is a data gateway node, an HLR, an HSS, or an AAA server; a second processing unit 18032 configured to query the stored mapping between the Push identifier and the address of the Push client according to the original address of the Push client, and update the corresponding address in the mapping according to the new address, that is, use the new address to update the original address of the Push client.

The second processing unit 18032 is specifically configured to query, according to the original address of the Push client, the mapping that is between the Push identifier and the address of the Push client and is stored by the first storing module 1802, and update the corresponding address in the mapping according to the new address.

Optionally, in the cooperation apparatus shown in FIG. 21, the structure of the first obtaining module 1801 may be the same as the structure of the first obtaining module 1801 in FIG. 19 or FIG. 20, and is not limited in the embodiment.

Optionally, in the cooperation apparatus shown in FIG. 21, the second processing unit 18032 is further configured to send a trigger message to the network-side network element, where the trigger message carries the address of the Push client and is used to trigger the network-side network element to notify the first processing unit 18031 when the network-side network element perceives the change of the address of the Push client.

Figure 22:
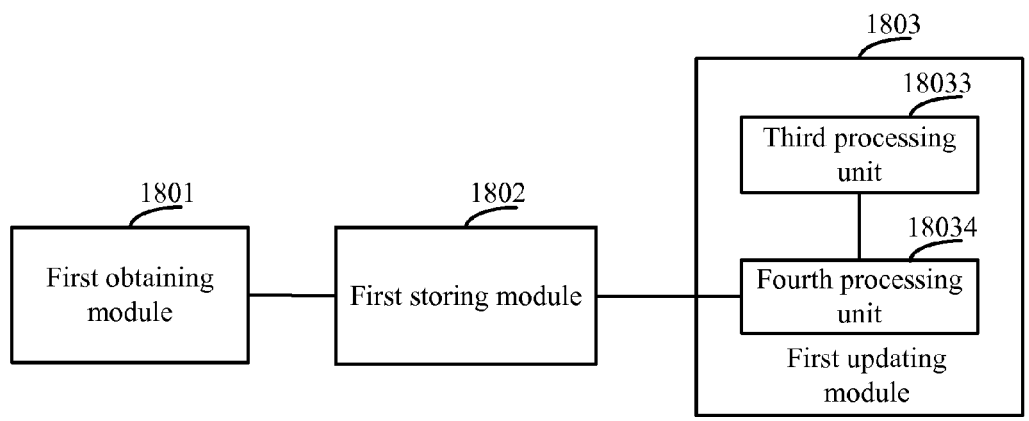

FIG. 22 is a structural diagram of another apparatus for cooperation between push devices according to an embodiment of the present invention. The cooperation apparatus shown in FIG. 22 is obtained after the cooperation apparatus shown in FIG. 18 is optimized, where the first updating module 1803 may include: a third processing unit 18033 configured to receive an address update message sent by the Push client, where the address update message carries the Push identifier of the Push client and the new address after the change, where the new address after the change is perceived by the Push client; and a fourth processing unit 18034 configured to query, according to the Push identifier of the Push client, the mapping that is between the Push identifier and the address of the Push client and is stored by the first storing module 1802, and update the corresponding address in the mapping according to the new address.

Optionally, in the cooperation apparatus shown in FIG. 22, the structure of the first obtaining module 1801 may be the same as the structure of the first obtaining module 1801 in FIG. 19 or FIG. 20, and is not limited in the embodiment.

Figure 23:
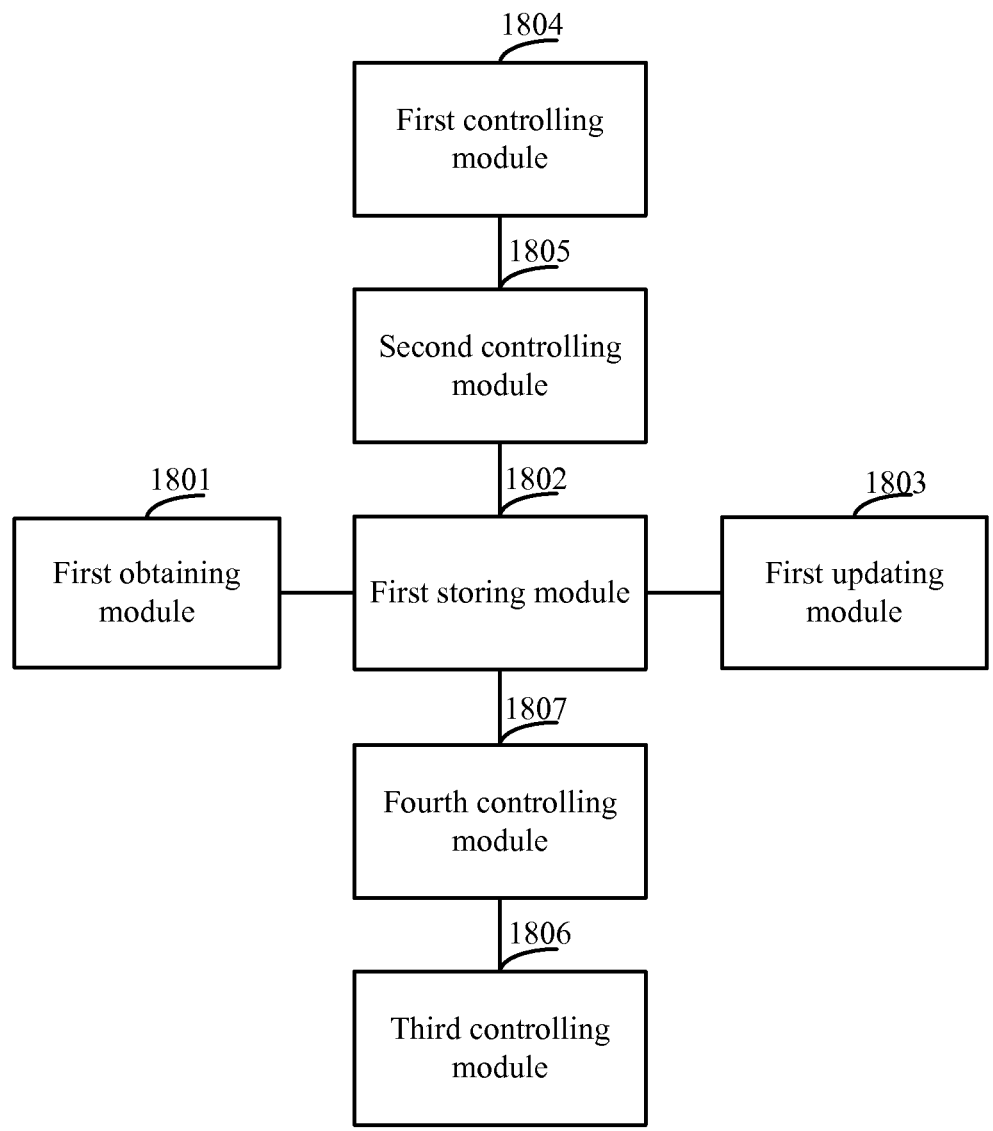

FIG. 23 is a structural diagram of another apparatus for cooperation between push devices according to an embodiment of the present invention. The cooperation apparatus shown in FIG. 23 is obtained by optimizing the cooperation apparatus shown in FIG. 18, and not only includes the first obtaining module 1801, the first storing module 1802, and the first updating module 1803, but also includes: a first controlling module 1804 configured to receive a Push message sent by a Push server, where the Push message carries a Push identifier of the Push client; and a second controlling module 1805 configured to obtain, according to the Push identifier of the Push client, the address of the Push client from the mapping that is between the Push identifier and the address of the Push client and is stored by the first storing module 1802, and notify the address to the first controlling module 1804.

Accordingly, the first controlling module 1804 is further configured to send, according to the address of the Push client notified by the second controlling module 1805, the Push message sent by the Push server to the Push client.

Optionally, before sending the Push message sent by the Push server to the Push client, the first controlling module 1804 may first convert the format of the Push message to adapt to the interface of the Push client, so that a Push service is not confined to a particular Push client.

Optionally, in the cooperation apparatus shown in FIG. 23, the structure of the first obtaining module 1801 may be the same as the structure of the first obtaining module 1801 shown in FIG. 19 or FIG. 20, and the structure of the first updating module 1803 may be the same as the structure of the first updating module 1803 in FIG. 21 or FIG. 22, and is not limited in the embodiment.

A third controlling module 1806 is configured to receive an address release message sent by the network-side network element, where the address release message carries the address of the Push client to be released, where the address of the Push client to be released is perceived by the network-side network element, The network-side network element is a data gateway node, an HLR, an HSS, or an AAA server.

A fourth controlling module 1807 is configured to query, according to the address, the mapping that is between the Push identifier and the address of the Push client and is stored by the first storing module 1802, and mark the corresponding address in the mapping as unobtained or as a special value.

Optionally, in the cooperation apparatus shown in FIG. 23, the third controlling module 1806 may be further configured to receive a deregistration request message sent by the Push client, where the deregistration request message carries at least the Push identifier of the Push client.

Accordingly, the fourth controlling module 1807 may be further configured to send a deregistration request response message to the Push client and delete the mapping that is between the Push identifier and the address of the Push client and is stored by the first storing module 1802.

Optionally, in the cooperation apparatus shown in FIG. 23, the third controlling module 1806 may be further configured to receive a deregistration request message sent by the Push client, where the deregistration request message carries at least the Push identifier of the Push client, and may further carry the address of the Push server optionally.

Accordingly, the fourth controlling module 1807 may be further configured to: send the deregistration request message to the Push server; receive a deregistration request response message sent by the Push server and send the response message to the Push client, and delete the mapping that is between the Push identifier and the address of the Push client and is stored by the first storing module 1802.

In the apparatus for cooperation between push devices according to the embodiment, the first storing module 1802 may store the mapping between the Push identifier and the address of the Push client; and when the address of the Push client changes, the first updating module 1803 may timely update the address of the Push client stored, without a heartbeat operation. Therefore, the validity and reachability of IP connections of the Push client can be improved, and the real-time performance and reliability of Push messages can be improved. In addition, eliminating the heartbeat between the Push client and the Push server can save energy of the Push client and network-side resources. Further, the cooperation apparatus may convert Push messages of different formats sent by different Push servers into Push messages of a unified format and send the messages to Push clients, so that a Push service is not confined to a particular Push client.

Embodiment 6

Figure 24:
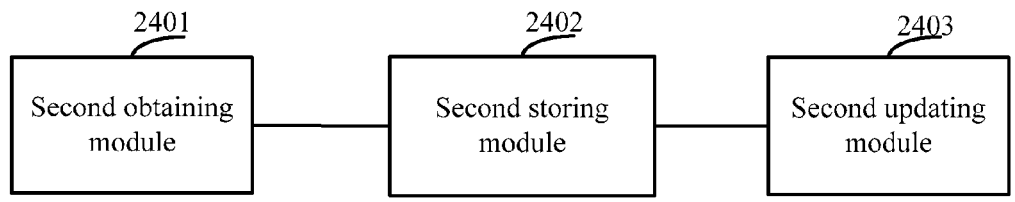

FIG. 24 is a structural diagram of an apparatus for cooperation between push devices according to an embodiment of the present invention, where the apparatus is configured to implement the function of the Push proxy in the foregoing third and fourth embodiments. As shown in FIG. 24, the cooperation apparatus may include: a second obtaining module 2401 configured to obtain a Push identifier, an intra-network identifier, and an address of a Push client; a second storing module 2402 configured to store mapping between the Push identifier, the intra-network identifier, and the address of the Push client; and a second updating module 2403 configured to update the corresponding address in the mapping if the address of the Push client changes.

Figure 25:
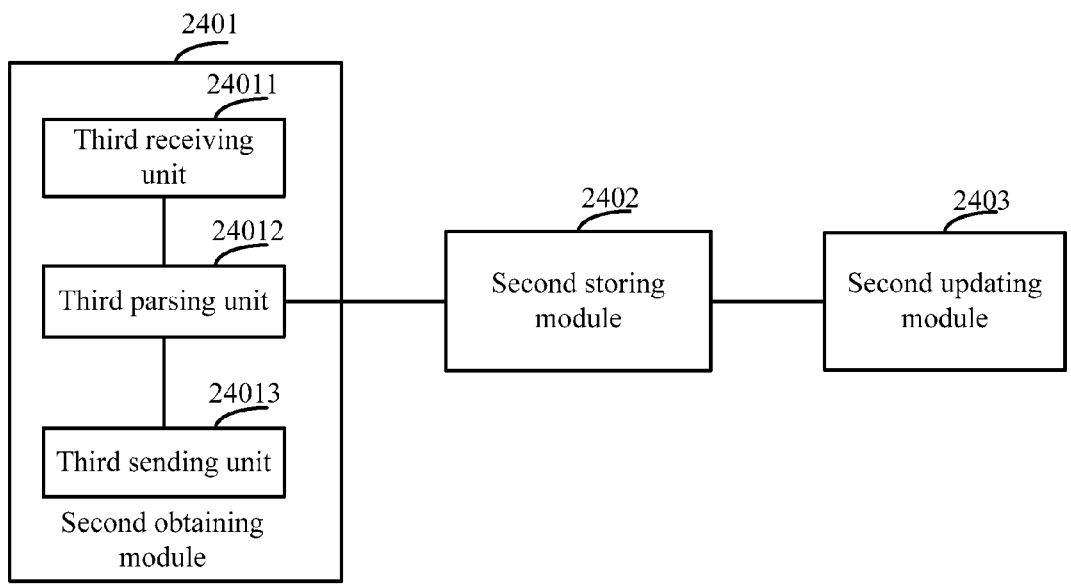

FIG. 25 is a structural diagram of another apparatus for cooperation between push devices according to an embodiment of the present invention. The cooperation apparatus shown in FIG. 25 is obtained after the cooperation apparatus shown in FIG. 24 is optimized, where the second obtaining module 2401 may include: a third receiving unit 24011 configured to receive a Push registration request message sent by the Push client, where the Push registration request message or the data packet header of the message carries the address of the Push client, and may further carry the address of a Push server optionally; a third parsing unit 24012 configured to parse the Push registration request message or the data packet header of the message to obtain the address of the Push client, and query a network-side network element according to the address of the Push client to obtain the intra-network identifier of the Push client, where the network-side network element is a data gateway node, or an HLR, an HSS, or an AAA server; and a third sending unit 24013 configured to send the Push registration request message to the Push server.

Accordingly, the third receiving unit 24011 is further configured to receive a Push registration request response message sent by the Push server, where the Push registration request response message carries a Push identifier allocated by the Push server to the Push client.

Accordingly, the third parsing unit 24012 is further configured to parse the Push registration request response message to obtain the Push identifier of the Push client.

Figure 26:
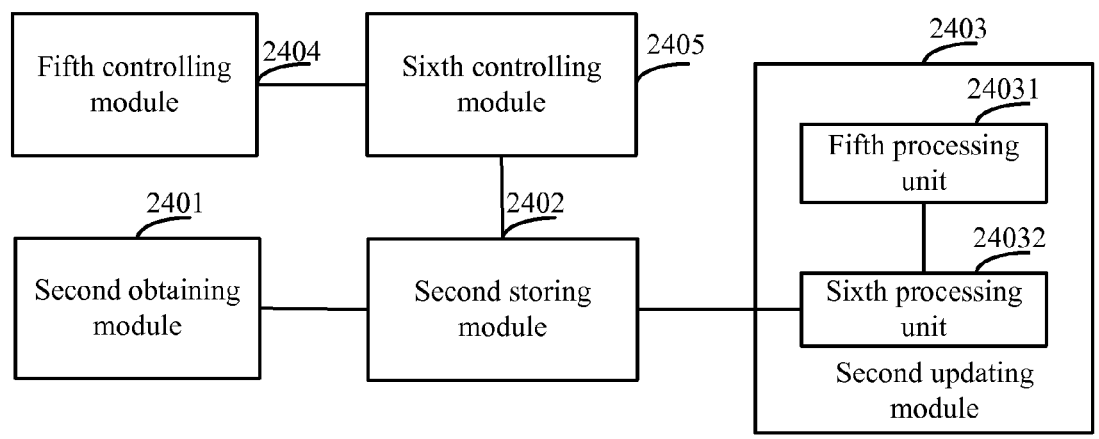

FIG. 26 is a structural diagram of another apparatus for cooperation between push devices according to an embodiment of the present invention. The cooperation apparatus shown in FIG. 26 is obtained after the cooperation apparatus shown in FIG. 24 is optimized, where the second updating module 2403 may include: a fifth processing unit 24031 configured to receive an address update message sent by the network-side network element, where the address update message carries the intra-network identifier of the Push client and the new address of the Push client after the change, where the new address of the Push client after the change is perceived by the network-side network element; where the network-side network element is a data gateway node, an HLR, an HSS, or an AAA server; and a sixth processing unit 24032 configured to query, according to the intra-network identifier, the mapping that is between the Push identifier, the intra-network identifier, and the address of the Push client and is stored by the second storing module 2402, and update the corresponding address in the mapping according to the new address.

Optionally, in the cooperation apparatus shown in FIG. 26, the structure of the second obtaining module 2401 may be the same as the structure of the second obtaining module 2401 in FIG. 25, and is not limited in the embodiment.

As shown in FIG. 26, the cooperation apparatus provided by the embodiment may further include: a fifth controlling module 2404 configured to receive a Push message sent by a Push server, where the Push message carries a Push identifier of the Push client; and a sixth controlling module 2405 configured to: obtain, according to the Push identifier of the Push client, the intra-network identifier of the Push client from the mapping that is between the Push identifier, the intra-network identifier, and the address of the Push client and is stored by the second storing module 2402; convert the Push message into an SMS message or a WAP Push message, and send the converted message to an SMSC or a WAP Push proxy gateway, where the converted message carries the intra-network identifier corresponding to the Push identifier.

In the apparatus for cooperation between push devices according to the embodiment, the second storing module 2402 may store the mapping between the Push identifier, the intra-network identifier, and the address of the Push client; and when the address of the Push client changes, the second updating module 2403 may timely update the address of the Push client stored, without a heartbeat operation. Therefore, the validity and reachability of IP connections of the Push client can be improved, and the real-time performance and reliability of Push messages can be improved. In addition, eliminating the heartbeat between the Push client and the Push server can save energy of the Push client and network-side resources.

Persons of ordinary skill in the art should understand that all or part of the steps of the method according to the embodiments of the present invention may be implemented by a program instructing relevant hardware. The program may be stored in computer readable storage media. When the program runs, the program performs the steps of the method specified in any embodiment of the present invention. The storage media may be any media capable of storing program codes, such as a read-only memory (ROM), a random access memory (RAM), a magnetic disk, or a Compact Disk-Read Only Memory (CD-ROM).

Detailed above are a method and an apparatus for cooperation between push devices according to the embodiments of the present invention. Although the principle and implementation of the present invention are described with reference to exemplary embodiments, the embodiments described above are only intended to help understand the method and core idea of the present invention. In addition, with respect to the specific implementation and application scope of the present invention, modifications and variations may be made by persons of ordinary skill in the art according to the idea of the present invention. Therefore, the specification shall not be construed as a limitation on the present invention.

What is claimed is:

1. A method for cooperation between push devices comprising:
   obtaining, by a push proxy server, a push identifier, an intra-network identifier, and an address of a push client;

storing, by the push proxy server, a mapping between the push identifier, the intra-network identifier, and the address of the push client; and updating, by the push proxy server, a corresponding address in the mapping when the address of the push client changes, wherein obtaining, by the push proxy server, the push identifier, the intra-network identifier, and the address of the push client comprises:
  receiving, by the push proxy server, a push client network entry notification sent by a network-side network element, wherein the push client network entry notification carries the address and the intra-network identifier of the push client, and wherein the network-side network element comprises a data gateway node, a home location register (HLR), a home subscriber server (HSS), or an authorization and accounting (AAA) server;
  querying authentication information of the push client and an address of a push server locally or obtaining authentication information of the push client and an address of a push server from a user information database according to the intra-network identifier, and sending a push registration request message to the push server;
  receiving a push registration request response message sent by the push server, wherein the push registration request response message carries the push identifier allocated by the push server to the push client; and
  parsing the push registration request response message to obtain the push identifier of the push client.

2. The method according to claim 1, wherein updating, by the push proxy server, the corresponding address in the mapping when the address of the push client changes comprises:
  receiving, by the push proxy server, an address update message sent by a network-side network element, wherein the address update message carries the intra-network identifier of the push client and a new address of the push client after the change which is perceived by the network-side network element, and wherein the network-side network element comprises a data gateway node, an HLR, an HSS, or an AAA server; and
  querying the stored mapping between the push identifier, the intra-network identifier, and the address of the push client according to the intra-network identifier, and updating the corresponding address in the mapping according to the new address.

3. The method according to claim 1, further comprising:
  receiving, by the push proxy server, a push message sent by push server, wherein the push message carries the push identifier of the push client;
  obtaining, by the push proxy server, the intra-network identifier of the push client from the stored mapping between the push identifier, the intra-network identifier, and the address of the push client according to the push identifier of the push client; and
  converting the push message into a Short Message Service (SMS) message or a Wireless Application Protocol (WAP) Push message, and sending the converted message to an SMS Center (SMSC) or a WAP Push proxy gateway, wherein the converted message carries the intra-network identifier corresponding to the push identifier.

4. An apparatus for cooperation between push devices comprising:
  a computer processor configured to obtain a push identifier and an address of a push client; and
  a memory configured to store a mapping between the push identifier, the intra-network identifier, and the address of the push client,
  wherein the computer processor is configured for:
    updating a corresponding address in the mapping when the address of the push client changes;
    receiving a push client network entry notification sent by a network-side network element, wherein the push client network entry notification carries the address and the intra-network identifier of the push client, and wherein the network-side network element comprises a data gateway node, a home location register (HLR), a home subscriber server (HSS), or an authorization and accounting (AAA) server;
    querying authentication information of the push client and an address of a push server locally or obtaining authentication information of the push client and an address of a push server from a user information database according to the intra-network identifier, and sending a push registration request message to the push server;
    receiving a push registration request response message sent by the push server, wherein the push registration request response message carries the push identifier allocated by the push server to the push client; and
    parsing the push registration request response message to obtain the push identifier of the push client.

* * * * *

UNITED STATES PATENT AND TRADEMARK OFFICE
CERTIFICATE OF CORRECTION

PATENT NO. : 9,247,018 B2
APPLICATION NO. : 13/753833
DATED : January 26, 2016
INVENTOR(S) : Bojie Li and Chenghui Peng It is certified that error appears in the above-identified patent and that said Letters Patent is hereby corrected as shown below:

On the title page item (30), Foreign Application Priority Data should read:

Jul. 30, 2010 (CN) ............................ 201010244030.9

Signed and Sealed this
Twelfth Day of April, 2016

Michelle K. Lee
*Director of the United States Patent and Trademark Office*